(12) United States Patent
Park et al.

(10) Patent No.: US 11,561,573 B2
(45) Date of Patent: Jan. 24, 2023

(54) DISPLAY DEVICE

(71) Applicant: Samsung Display Co., Ltd., Yongin-si (KR)

(72) Inventors: Sang Hui Park, Hwaseong-si (KR); Jin Wook Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 212 days.

(21) Appl. No.: 17/023,217

(22) Filed: Sep. 16, 2020

(65) Prior Publication Data

US 2021/0263554 A1  Aug. 26, 2021

(30) Foreign Application Priority Data

Feb. 26, 2020  (KR) .................. 10-2020-0023415

(51) Int. Cl.
  *G06F 3/16*   (2006.01)
  *G10K 9/122*   (2006.01)
  *G06F 1/16*   (2006.01)

(52) U.S. Cl.
  CPC .............. *G06F 1/1605* (2013.01); *G06F 3/16* (2013.01); *G10K 9/122* (2013.01)

(58) Field of Classification Search
  CPC ............. G06F 1/16; G06F 1/1605; G06F 3/16
  See application file for complete search history.

(56) References Cited

U.S. PATENT DOCUMENTS

| 10,574,803 | B2 | 2/2020 | Shim et al. | |
| 10,582,282 | B2 | 3/2020 | Kim | |
| 10,603,690 | B2 | 3/2020 | Zadesky et al. | |
| 2016/0118370 | A1* | 4/2016 | Wu | H01L 27/3232 362/19 |
| 2019/0052741 | A1* | 2/2019 | Shim | H04M 1/03 |
| 2019/0087004 | A1* | 3/2019 | Fan | G06F 3/016 |
| 2019/0163234 | A1* | 5/2019 | Kim | G06F 1/1626 |
| 2020/0184939 | A1* | 6/2020 | Lee | G06F 1/1688 |
| 2020/0267248 | A1 | 8/2020 | Park et al. | |
| 2020/0314515 | A1* | 10/2020 | Jang | H01L 41/0805 |
| 2020/0404427 | A1* | 12/2020 | Shin | H01L 41/183 |
| 2021/0136314 | A1* | 5/2021 | Shin | H04N 5/642 |
| 2021/0400394 | A1* | 12/2021 | Kim | H04R 7/045 |
| 2022/0129234 | A1* | 4/2022 | Nam | H04R 7/045 |

FOREIGN PATENT DOCUMENTS

| KR | 10-1517523 | 5/2015 |
| KR | 10-2017-0076567 | 7/2017 |
| KR | 10-1788428 | 10/2017 |
| KR | 10-2019-0017166 | 2/2019 |
| KR | 10-2019-0068336 | 6/2019 |

* cited by examiner

*Primary Examiner* — Chanh D Nguyen
*Assistant Examiner* — Nguyen H Truong
(74) *Attorney, Agent, or Firm* — H.C. Park & Associates, PLC

(57) ABSTRACT

A display device includes a display panel to display an image; and a sound generator disposed on a surface of the display panel to vibrate the display panel, wherein distances between each of a plurality of side surfaces of the sound generator and each of a plurality of side surfaces of the display panel respectively corresponding to the each of the plurality of side surfaces of the sound generator are substantially equal.

13 Claims, 25 Drawing Sheets

DISPLAY DEVICE

CROSS REFERENCE TO RELATED APPLICATION

This application claims priority from and the benefit of Korean Patent Application No. 10-2020-0023415, filed on Feb. 26, 2020, which is hereby incorporated by reference for all purposes as if fully set forth herein.

BACKGROUND

Field

Exemplary implementations of the invention relate generally to a display device, and more particularly, to a display device having a sound generator disposed on a lower surface of a display panel of the display device.

Discussion of the Background

A display device is mounted on an electronic product or a home appliance such as a television, a monitor, a notebook computer, a smartphone, a tablet computer, an electronic pad, a wearable device, a watch phone, a portable information device, a navigation device or a vehicle control display device and used as a screen for displaying an image.

A display device may include a display panel that displays an image and a sound generator that outputs sounds related to the image. The above information disclosed in this Background section is only for understanding of the background of the inventive concepts, and, therefore, it may contain information that does not constitute prior art.

SUMMARY

Applicant discovered that in a typical display device, because sound output from the sound generator travels backward or downward from the display device, sound quality is degraded by interference between sounds reflected from the wall or the ground. This interference can make accurate sound transmission difficult and disrupt a viewer's experience.

Display devices constructed according to principles and exemplary implementations of the invention improve the bass reproduction band, enhance the sound pressure level and improve the flatness of sound pressure in display devices, e.g., by including a sound generator disposed on a lower surface of a display panel to generate sound by vibrating the display panel.

In some exemplary implementations, the sound generator may be positioned substantially equidistantly from the sides of the display panel to improve the sound pressure level of the sound output from the display panel, and optimize constructive interference and destructive interference of vibrations of the display panel, thereby minimizing distortion of sound to improve the bass reproduction band and enhance the sound pressure level. Additional features of the inventive concepts will be set forth in the description which follows, and in part will be apparent from the description, or may be learned by practice of the inventive concepts.

According to one aspect of the invention, a display device includes: a display panel to display an image; and a sound generator disposed on a surface of the display panel to vibrate the display panel, wherein distances between each of a plurality of side surfaces of the sound generator and each of a plurality of side surfaces of the display panel respectively corresponding to the each of the plurality of side surfaces of the sound generator are substantially equal.

The display panel may include first through fourth side surfaces generally perpendicular or generally parallel to each other, the sound generator may include first through fourth side surfaces respectively corresponding to the first through fourth side surfaces of the display panel, and distances between each of the first through fourth side surfaces of the sound generator and each of the first through fourth side surfaces of the display panel may be substantially equal.

The ratio of a length of the first side surface of the display panel to a length of the second side surface generally perpendicular to the first side surface may be substantially equal to a ratio of a length of the first side surface of the sound generator corresponding to the first side surface of the display panel to a length of the second side surface of the sound generator corresponding to the second side surface of the display panel.

The sound generator may include a plurality of sound generators, each including one or more side surfaces respectively corresponding to the side surfaces of the display panel, and distances between each of the side surfaces of the display panel and at least some of the side surfaces of the sound generators respectively corresponding to the each of the side surfaces of the display panel may be substantially equal.

The sound generator may include first and second sound generators spaced apart from each other in a direction generally perpendicular to the first side surface and the second side surface of the display panel, and a first distance between a first side surface of the first sound generator and the first side surface of the display panel, a second distance between a second side surface of the second sound generator and the second side surface of the display panel, a third distance between a third side surface of the first or second sound generator and the third side surface of the display panel, and a fourth distance between a fourth side surface of the first or second sound generator and the fourth side surface of the display panel may be all substantially equal.

Each of the first through fourth distances may be smaller than a distance between the first and second sound generators.

The sound generator may include first and second sound generators spaced apart from each other in a direction generally parallel to the first side surface and the second side surface of the display panel, and a first distance between a first side surface of the first or second sound generator and the first side surface of the display panel, a second distance between a second side surface of the first or second sound generator and the second side surface of the display panel, a third distance between a third side surface of the first sound generator and the third side surface of the display panel, and a fourth distance between a fourth side surface of the second sound generator and the fourth side surface of the display panel may be all substantially equal.

Each of the first through fourth distances may be smaller than a distance between the first and second sound generators.

The sound generator may include first through fourth sound generators adjacent to first through fourth corners of the display panel, respectively, and a first distance between a first side surface of the first or second sound generator and the first side surface of the display panel, a second distance between a second side surface of the third or fourth sound generator and the second side surface of the display panel, a third distance between a third side surface of the first or third sound generator and the third side surface of the display panel, and a fourth distance between a fourth side surface of the second or fourth sound generator and the fourth side surface of the display may be all substantially equal.

The sound generator may include: a first sound generator having a plurality of side surfaces; and a second sound generator surrounding the first sound generator and having a plurality of side surfaces respectively corresponding to the side surfaces of the display panel.

The plurality of side surfaces of the second sound generator may include first to fourth side surfaces, and distances between each of first through fourth side surfaces of the second sound generator and each of the first through fourth side surfaces of the display panel may be substantially equal.

The first sound generator may have a first width in plan view and the second sound generator may have second width in plan view substantially equal to the first width.

According to another aspect of the invention, a display device includes: a display panel having first through fourth side surfaces; and a sound generator disposed on a surface of the display panel to vibrate the display panel and having first through fourth side surfaces respectively corresponding to the first through fourth side surfaces of the display panel, wherein distances between each of the first through third side surfaces of the sound generator and each of the first through third side surfaces of the display panel are substantially equal.

The sound generator may have a longitudinal axis generally parallel to the second or third side surface of the display panel, and the distances between each of the first through third side surfaces of the sound generator and each of the first through third side surfaces of the display panel are smaller than a distance between the fourth side surface of the sound generator and the fourth side surface of the display panel.

The ratio of a length of the first side surface of the display panel to a length of the second side surface generally perpendicular to the first side surface may be substantially equal to a ratio of a length of the first side surface of the sound generator corresponding to the first side surface of the display panel to a length of the second side surface of the sound generator corresponding to the second side surface of the display panel.

The sound generator may have a longitudinal axis generally parallel to the first or fourth side surface of the display panel, and the distances between each of the first through third side surfaces of the sound generator and each of the first through third side surfaces of the display panel are smaller than a distance between the fourth side surface of the sound generator and the fourth side surface of the display panel.

According to a further aspect of the invention, a display device includes: a substrate supporting a display surrounded by a first generally curved surface; and a sound generator disposed on a surface of the substrate to vibrate the substrate, the sound generator being surrounded by a second generally curved surface, wherein distances between each of a plurality of parts of the second generally curved surface and each of a plurality of parts of the first generally curved surface respectively corresponding to the plurality of parts of the second generally curved surface are substantially equal.

The substrate may include a generally circular arc part having at least one generally circular arc and a protruding part extending from a side of the generally circular arc part, and further including a generally circular display part disposed on the generally circular arc part, wherein the sound generator may have a generally circular shape corresponding to the generally circular display part and has substantially the same center point as the generally circular display part.

The sound generator may include: a first sound generator including a generally circular side surface having a first radius; and a second sound generator at least partially surrounding the first sound generator at a distance from the first sound generator, the second sound generator including a generally circular side surface having a second radius greater than the first radius.

The first sound generator may have a first width in plan view and the second sound generator may have a second width in plan view substantially equal to the first width.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

Figure 19:
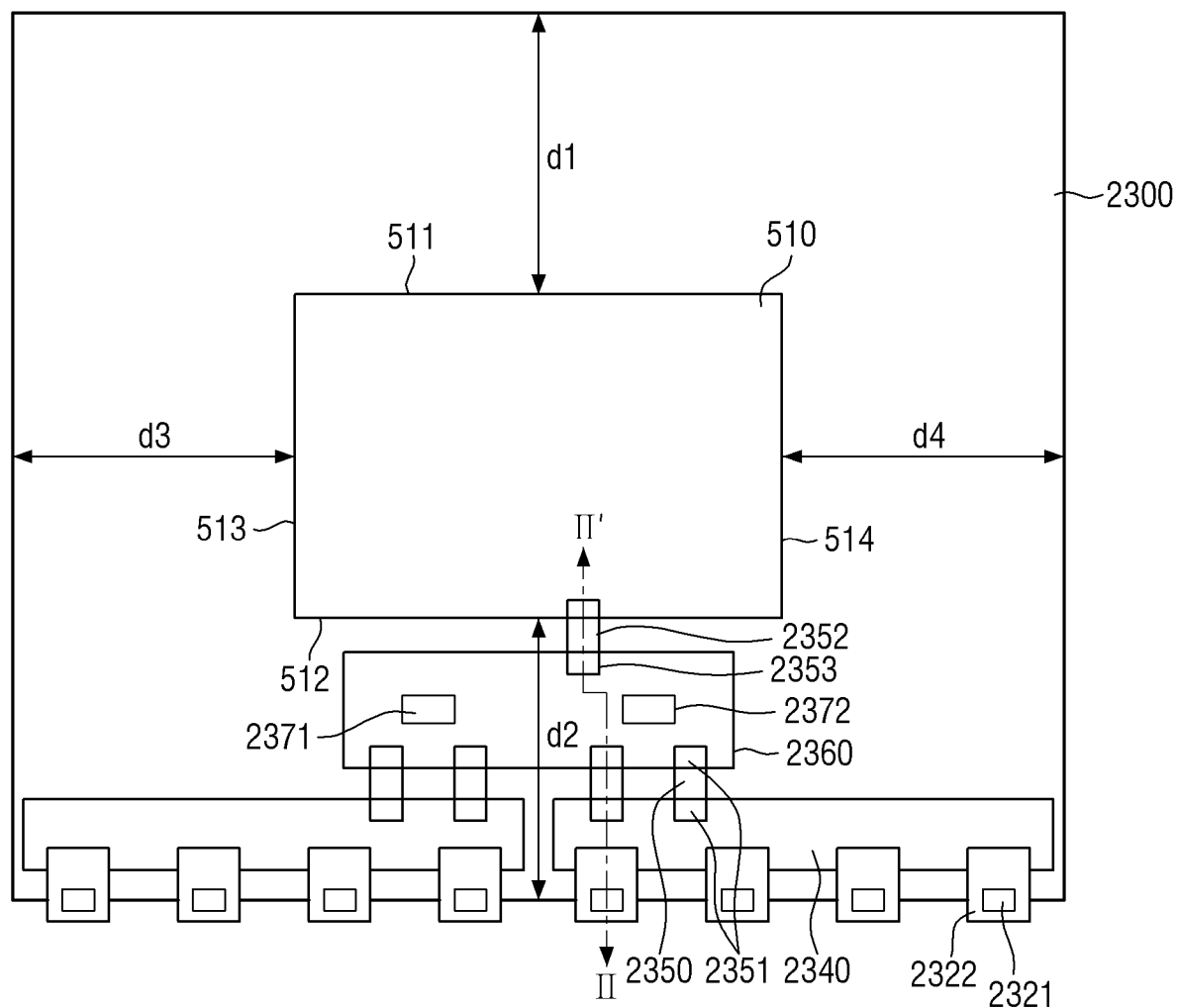
FIG. 19 is a bottom vie of the display device of FIG. 17.

FIG. is a cross-sectional view taken along line II-II' of FIG. 19.

Figure 17:
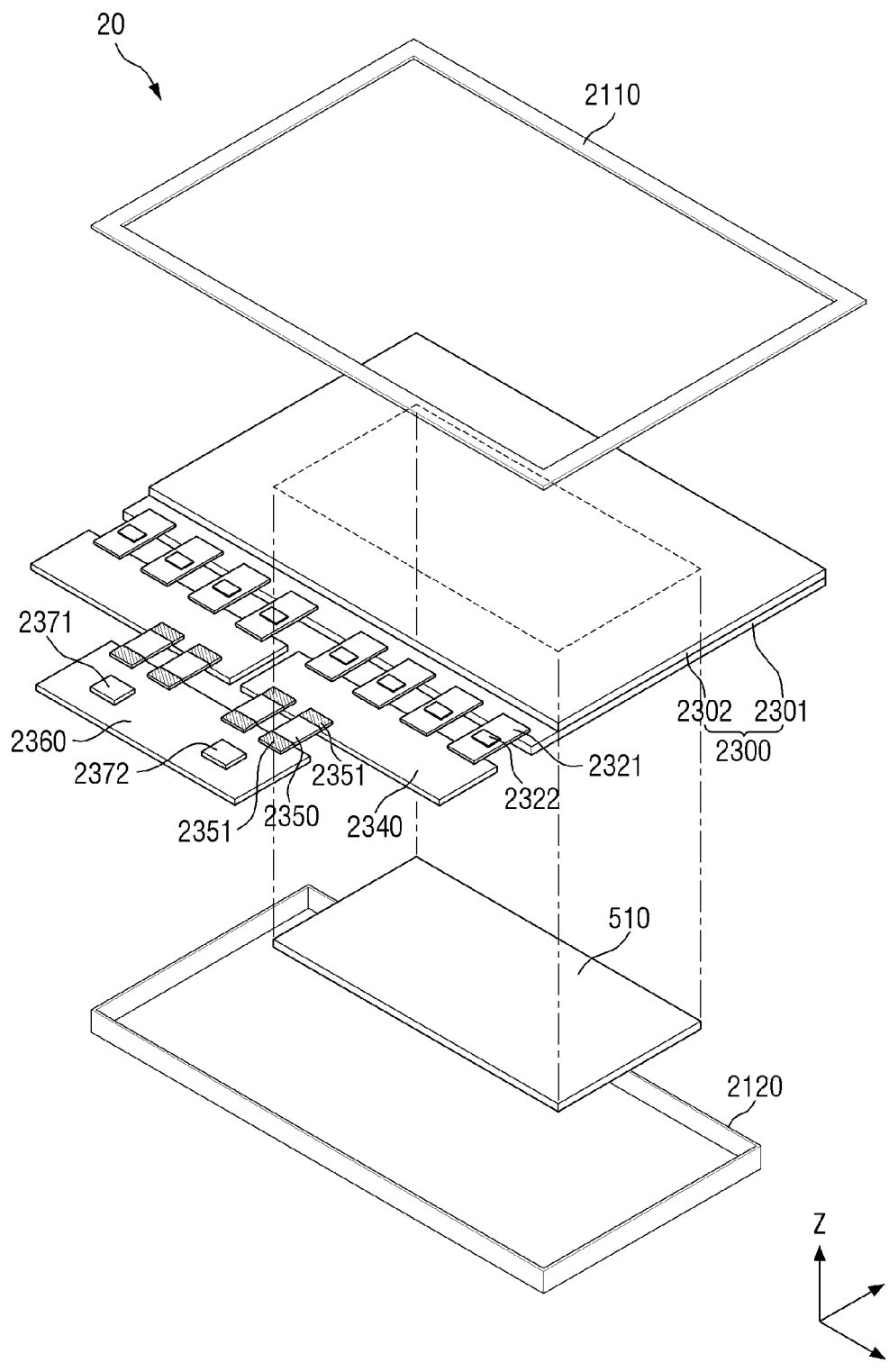
FIG. 17 is an exploded perspective view of an exemplary embodiment of a display device constructed according to principles of the invention.
Figure 21:
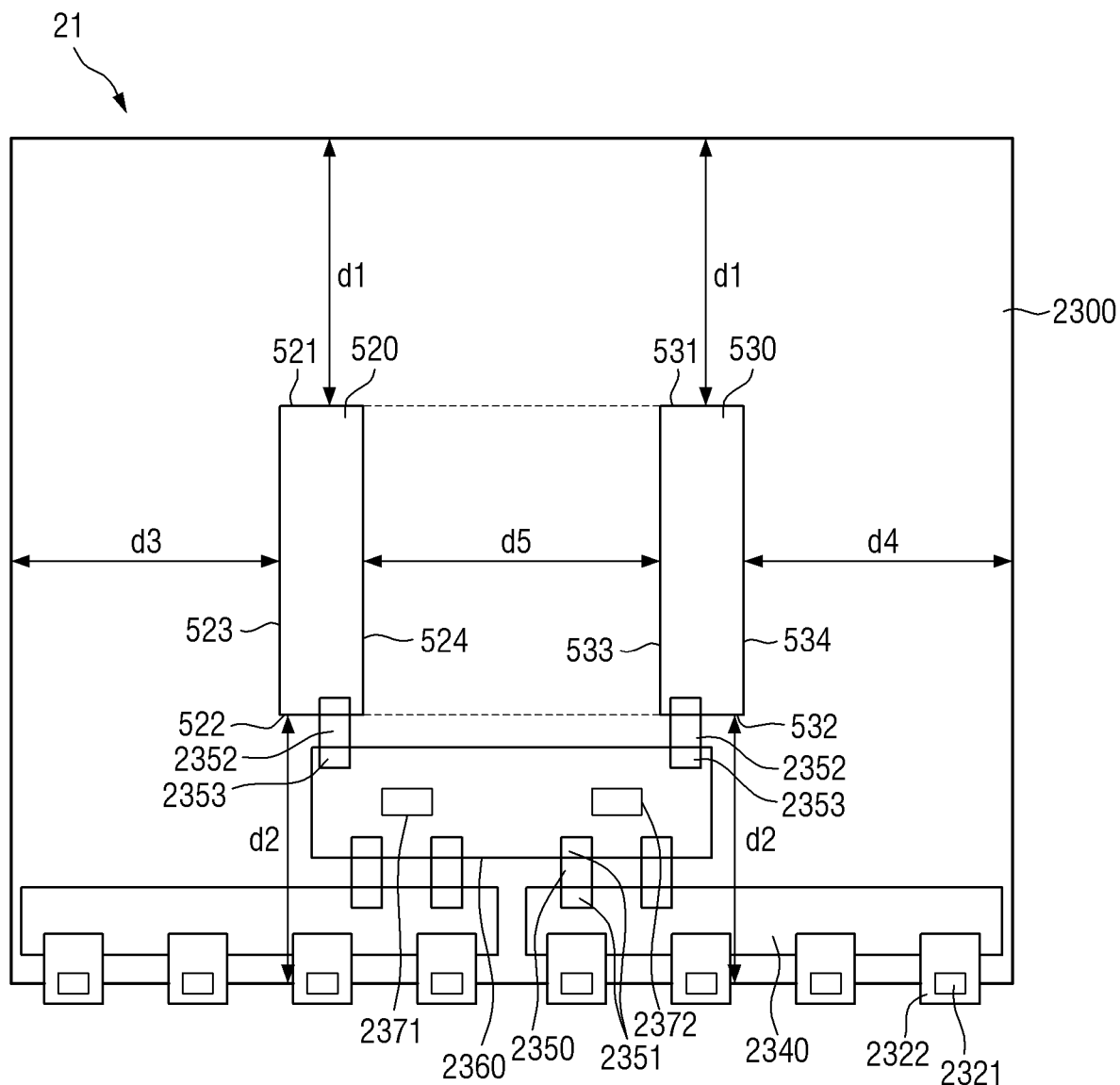

FIG. 21 is a bottom view of another exemplary embodiment of the display device of FIG. 17.

Figure 22:
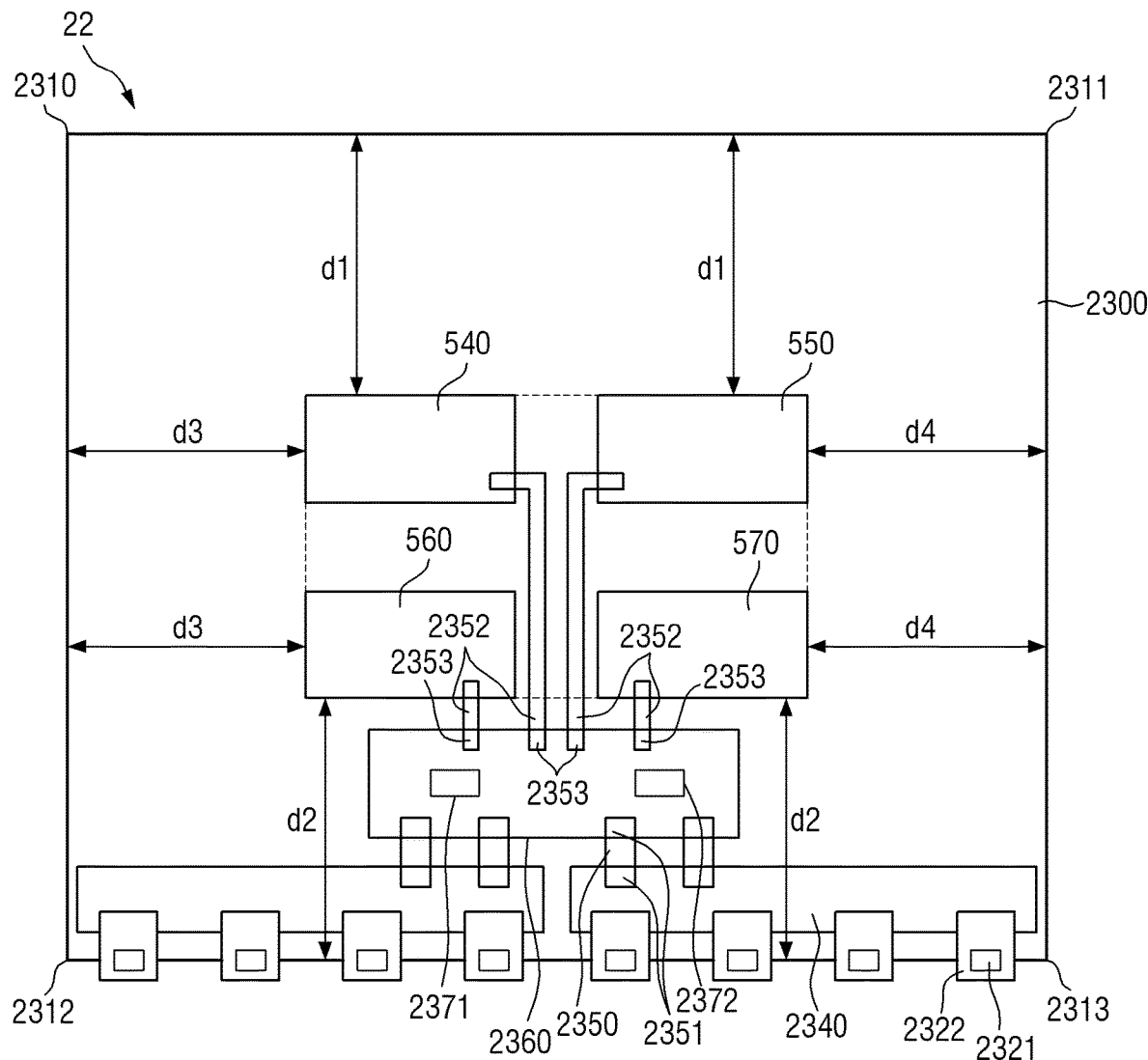

FIG. 22 is a bottom view of still another exemplary embodiment of the display device of FIG. 17.

Figure 23:
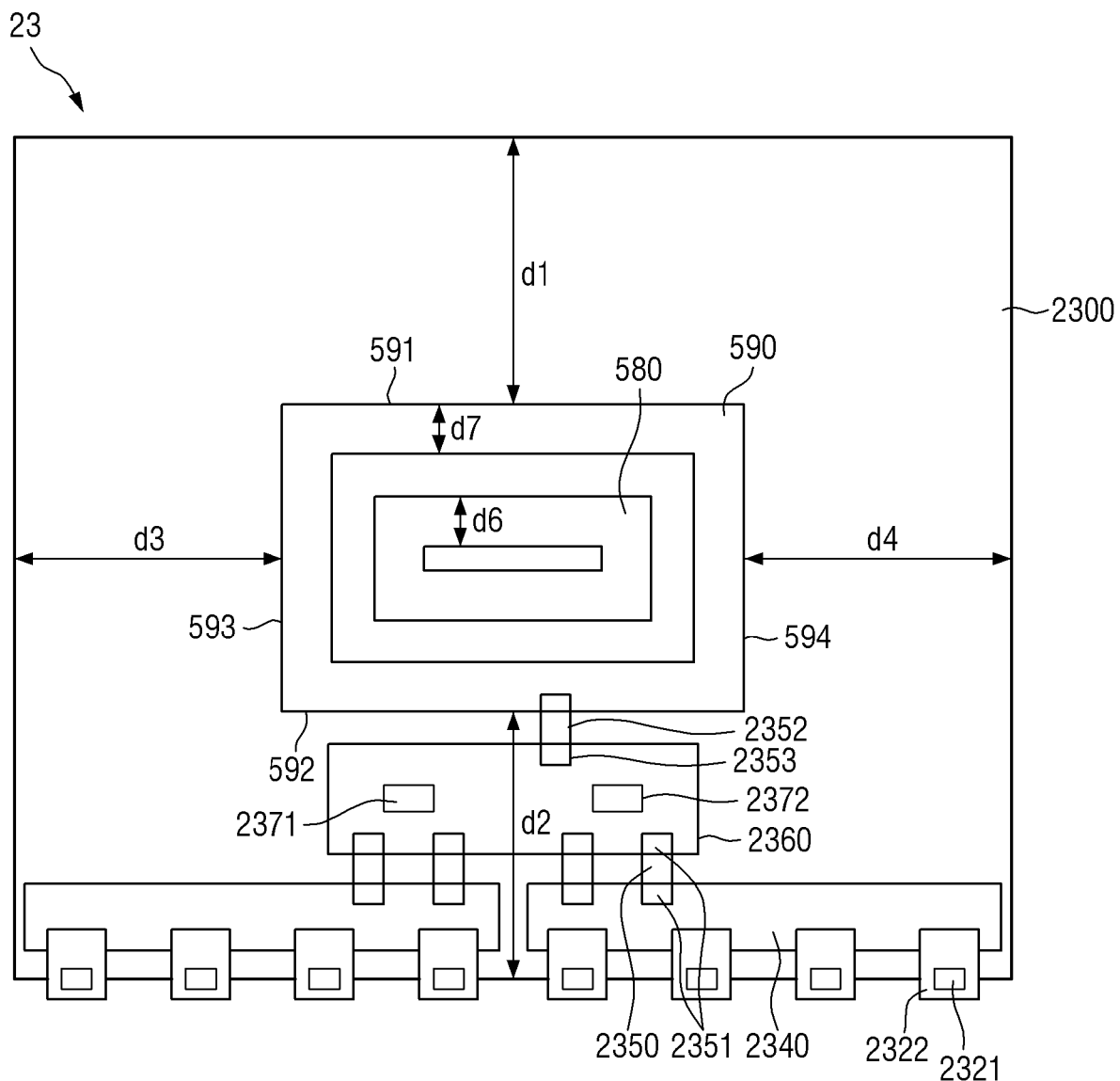

FIG. 23 is a bottom view of a further exemplary embodiment of the display device of FIG. 17.

Figure 24:
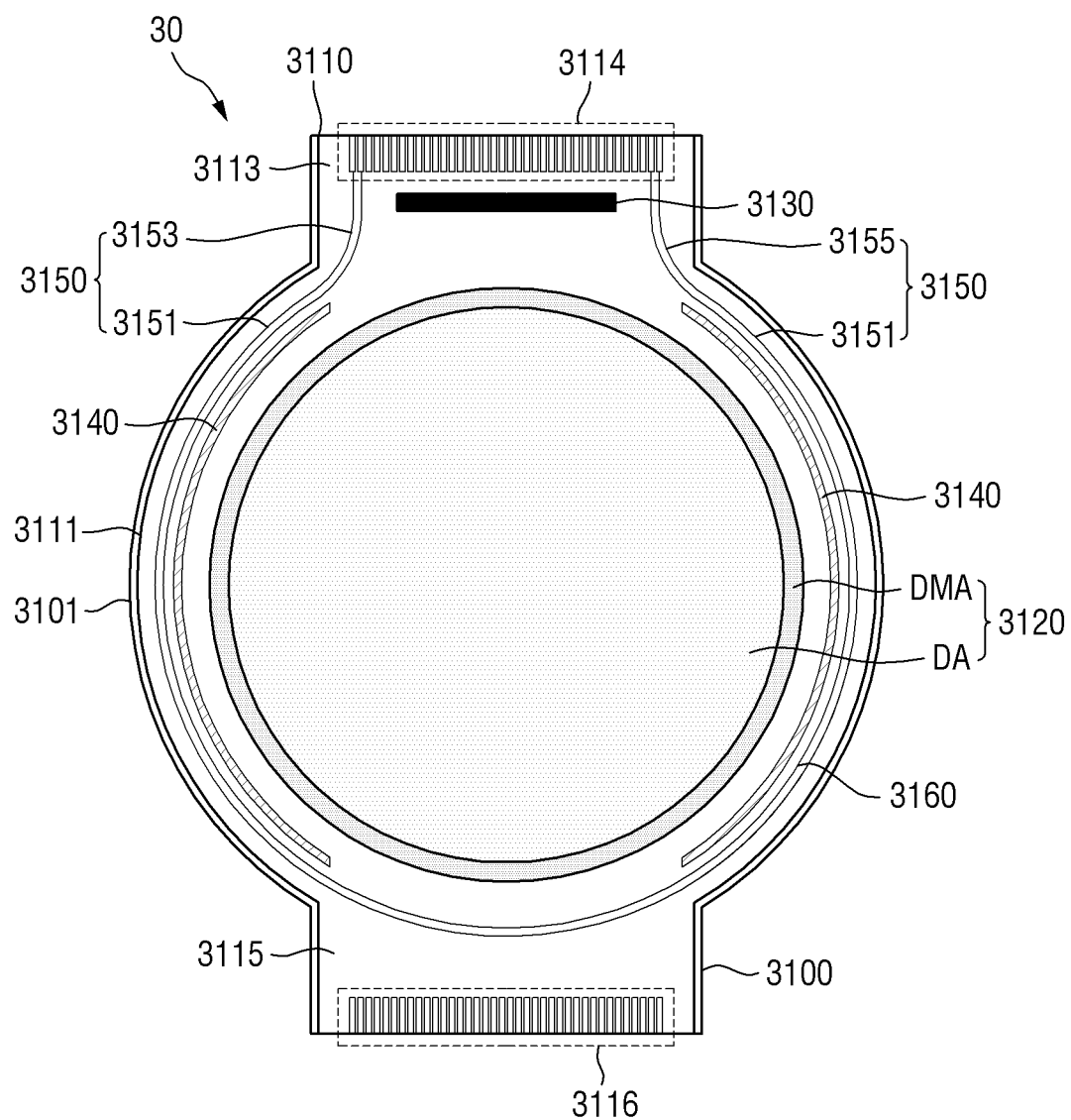

FIG. 24 is a plan view of yet another exemplary embodiment of a display device constructed according to principles of the invention.

Figure 25:
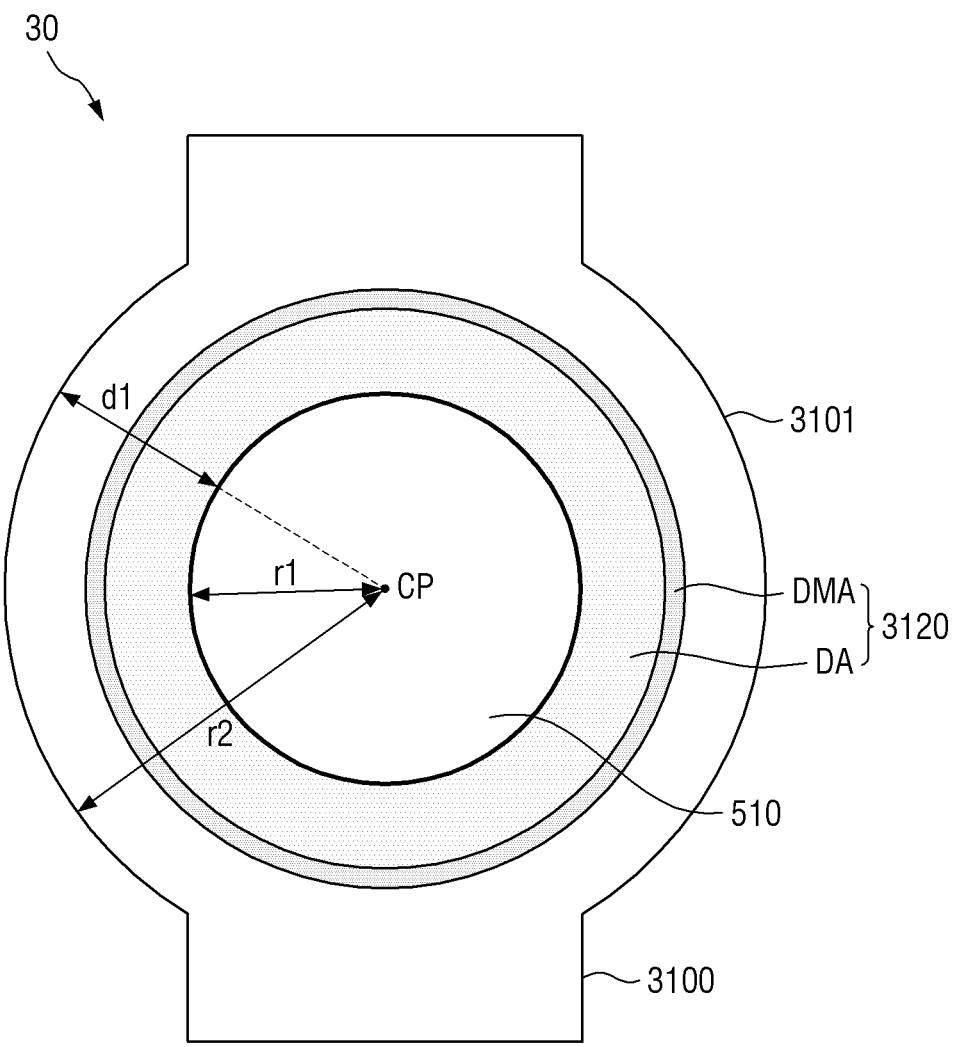

FIG. 25 is a bottom view of the yet another exemplary embodiment of the display device of FIG. 24.

Figure 26:
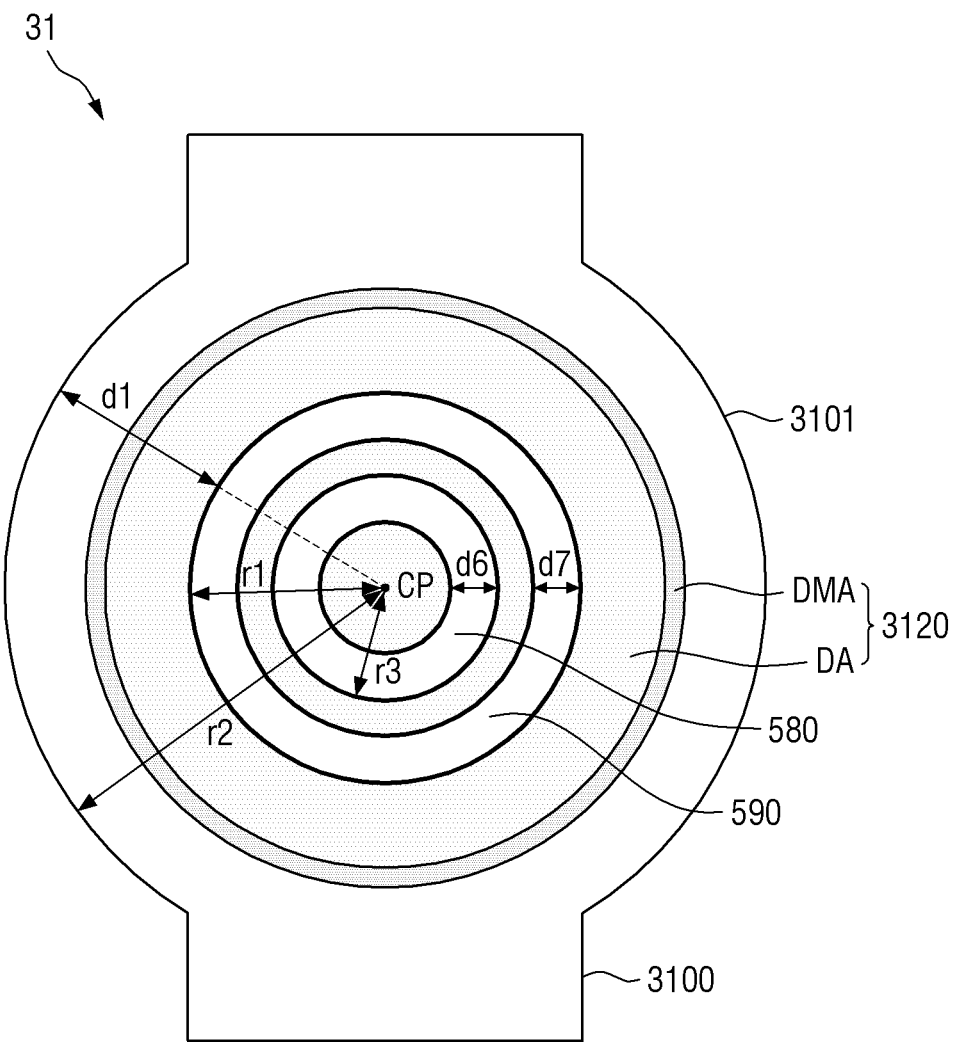

FIG. 26 is a bottom view of the yet another exemplary embodiment of the display device of FIG. 24.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

Generally, as used herein, "above,"+"top," and "upper surface" may refer to an upward direction from a display device, that is, a Z-axis direction, and "under," "bottom," and "lower surface" may refer to a downward direction from the display device, that is, a direction opposite to the Z-axis direction. In addition, "left," "right," "upper," and "lower" may refer to directions when the display device is seen in a plane. For example, "left" nay refer to a direction opposite to an X-axis direction, "right" may refer to the X-axis direction, "upper" may refer to a Y-axis direction, and "lower" a direction opposite to the Y-axis direction.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
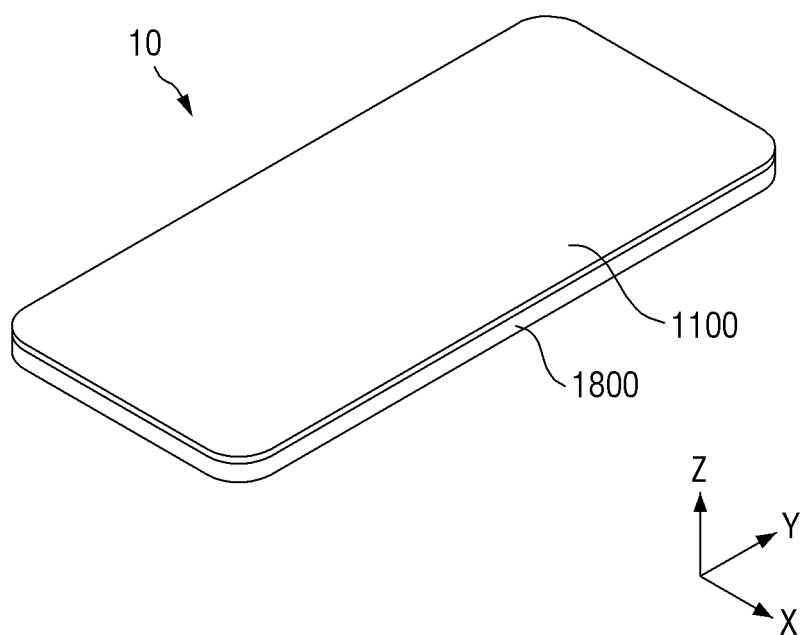
FIG. 1 is a perspective view of an exemplary embodiment of a display device constructed according to principles of the invention.
Figure 2:
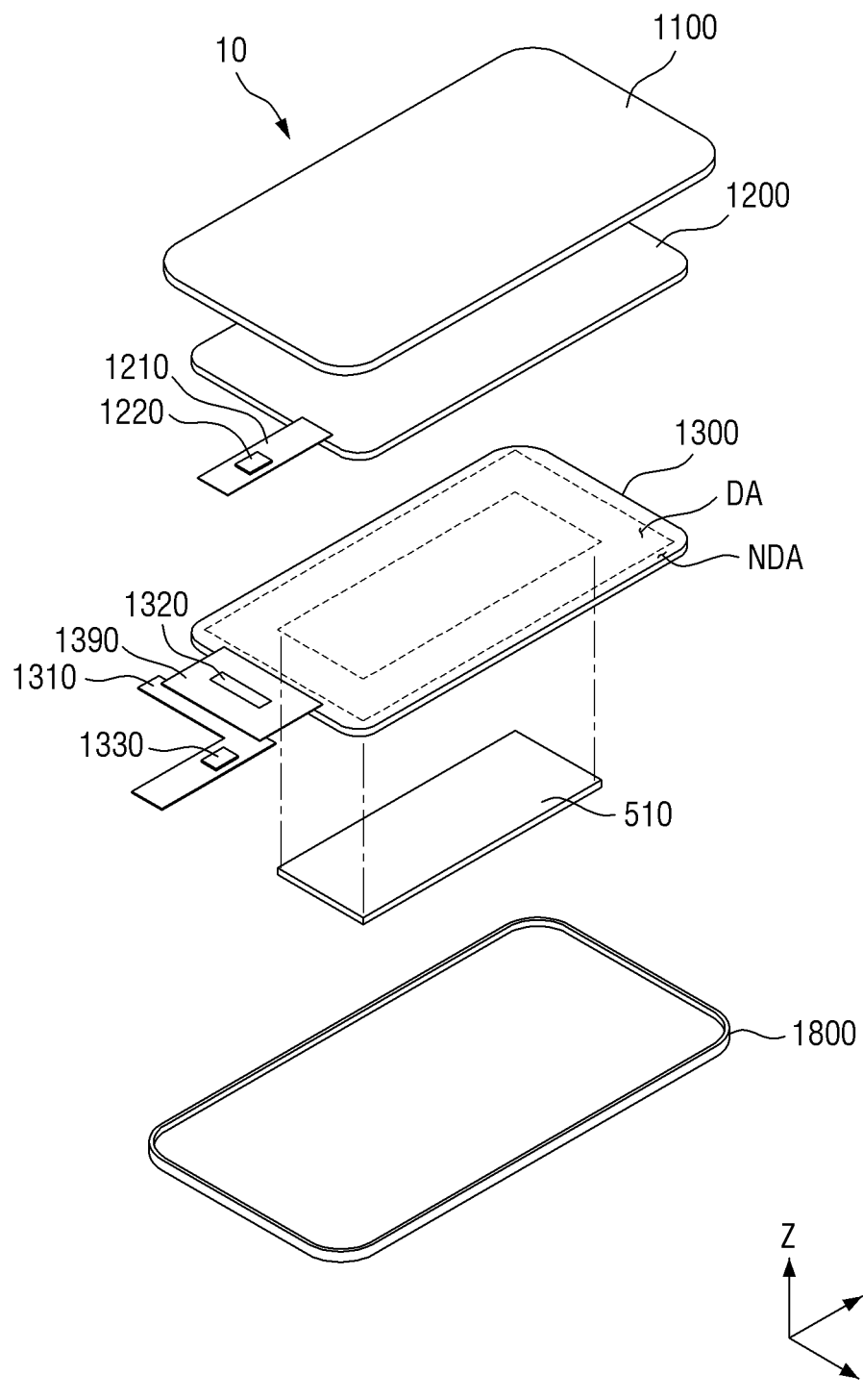
FIG. 2 is an exploded perspective view of the display device of FIG. 1.

FIG. 1 is a perspective view of an exemplary embodiment of a display device constructed according to principles of the invention. FIG. 2 is an exploded perspective view of the display device of FIG. 1.

Hereinafter, some numerals appearing in previously described drawings are omitted to avoid redundancy. Referring to FIGS. 1 and 2, the display device 10 is a device for displaying moving images or still images. The display device 10 may be used as a display screen in portable electronic devices such as mobile phones, smartphones, tablet personal computers (PCs), smart watches, watch phones, mobile communication terminals, electronic notebooks, electronic books, portable multimedia players (PMPs), navigation devices and ultra-mobile PCs (UMPCs), as well as in various products such as televisions, notebook computers, monitors, billboards and the Internet of things (IoT).

The display device 10 may be generally rectangular in a plan view. For example, the display device 10 may have a generally rectangular planar shape having short sides in a first direction (X-axis direction) and long sides in a second direction (Y-axis direction) Each corner where a short side extending in the first direction (X-axis direction) meets a long side extending in the second direction (Y-axis direction) may be generally right-angled or may be generally rounded with a predetermined curvature. The planar shape of the display device 10 is not limited to the generally rectangular shape, but may also be another generally polygonal shape, a generally circular shape, or a generally oval shape. For example, the display device 10 may be formed generally flat, but the exemplary embodiments are not necessarily limited thereto. For another example, the display device 10 may be bent with a predetermined curvature.

The display device 10 may include a cover window 1100, a touch sensing device 1200, a display panel 1300, a sound generator 510, and a bottom cover 1800. The cover window 1100 may be disposed above the display panel 1300 to cover an upper surface of the display panel 1300. The cover window 1100 may protect the upper surface of the display panel 1300. For example, the cover window 1100 may be attached to the touch sensing device 1200 through an adhesive member. The adhesive member may be an optically clear adhesive film (OCA) or an optically clear resin (OCR).

The cover window 1100 may include a light transmitting part displaying an image of the display panel 1300 and a light blocking part corresponding to an area other than the light transmitting part. The light blocking part of the cover window 1100 may be opaque to prevent unnecessary components other than an image of the display panel 1300 from being visible to a user. Alternatively, the light blocking part of the cover window 1100 may be formed as a decorative layer having a pattern that is shown to a user when an image is not displayed. For example, the light blocking part of the cover window 1100 may be patterned with a company's logo or various characters.

For example, the cover window 1100 may be made of a glass, a sapphire, or a plastic, but the exemplary embodiments are not necessarily limited thereto. The cover window 1100 may be rigid or flexible. The touch sensing device 1200 may be disposed between the cover window 1100 and the display panel 1300. The touch sensing device 1200 may sense a touch position of a user and may be implemented as a capacitance type, such as a self-capacitance type or a mutual capacitance type, or an infrared type.

The touch sensing device 1200 may be disposed on an upper substrate of the display panel 1300. Alternatively, the touch sensing device 1200 may be integrally formed with the display panel 1300. In this case, the upper substrate of the display panel 1300 may be omitted, and the touch sensing device 1200 may be formed on an encapsulation film of the display panel 1300. For example, the touch sensing device 1200 may further include a pressure sensor that can sense a user's pressure.

For example, the display device 10 may further include a polarizing film on the touch sensing device 1200 to prevent the visibility of an image displayed by the display panel 1300 from being reduced by the reflection of external light by lines of the touch sensing device 1200 or lines of the display panel 1300.

The touch sensing device 1200 may include a touch circuit board 1210 and a touch driver 1220. The touch circuit board 1210 may be disposed on a side of the touch sensing device 1200. For example, the touch circuit board 1210 may be attached onto pads provided on the side of the touch sensing device 1200 through an anisotropic conductive film. The touch circuit board 1210 may include a touch connection terminal, and the touch connection terminal may be connected to a connector of a display circuit board 1310. The touch circuit board 1210 may be a flexible printed circuit board or a chip on film.

The touch driver 1220 may be formed as an integrated circuit and mounted on the touch circuit board 1210. The touch driver 1220 may be electrically connected to touch electrodes of the touch sensing device 1200 through the touch circuit board 1210. The touch driver 1220 may transmit touch driving signals to driving electrodes among the touch electrodes and receive sensing signals from sensing electrodes among the touch electrodes. The touch driver 1220 may output touch data including touch coordinates of a user by detecting a change in capacitance between the driving electrodes and the sensing electrodes based on the sensing signals.

The display panel 1300 may include a display area DA in which a plurality of pixels is formed to display an image and a non-display area NDA disposed around the display area DA. The display area DA may include the pixels, scan lines connected to the pixels, emission control lines, data lines, and voltage supply lines. The scan lines and the emission control lines may extend generally parallel to each other in the first direction (X-axis direction), and the data lines and the voltage supply lines may extend generally parallel to each other in the second direction (Y-axis direction) intersecting the first direction (X-axis direction).

The non-display area NDA may be an area extending from the outside of the display area DA to edges of the display panel 1300. For example, the non-display area NDA may include a scan driver transmitting scan signals to the scan lines, an emission control driver transmitting emission signals to the emission control lines, fan-out lines disposed between the data lines and pads, and the pads connected to a flexible film 1390. For example, the pads may be disposed on an edge of the display panel 1300.

The display panel 1300 may include the display circuit board 1310, a display driver 1320, a sound driver 1330, and the flexible film 1390. The display circuit board 1310 may be attached to a side of the display panel 1300. For example, an end of the display circuit board 1310 may be attached onto the pads provided on the side of the display panel 1300 through an anisotropic conductive film. The touch circuit board 1210 and the display circuit board 1310 may be a flexible printed circuit boards and may be bent generally downward from the top of the display panel 1300. The display circuit board 1310 may be connected to the touch connection terminal of the touch circuit board 1210 through the connector.

The display driver 1320 may be disposed on the flexible film 1390 to supply signals and voltages for driving the display panel 1300. For example, the display driver 1320 may receive digital video data and timing signals from a main circuit board, convert the digital video data into analog positive/negative data voltages, and supply the analog positive/negative data voltages to the data lines through the pads. The display driver 1320 may supply a scan control signal for controlling the scan driver through the scan control lines. In addition, the display driver 1320 may supply power voltages necessary for driving subpixels of the display panel 1300 to the pads.

The display driver 1320 may be formed as an integrated circuit and mounted on the flexible film 1390, but the exemplary embodiments are not necessarily limited thereto. For example, the display driver 1320 may be attached to the side of the display panel 1300.

The sound driver 1330 may be disposed on the display circuit board 1310 to supply a sound signal to the sound generator 510. The sound driver 1330 may receive sound data from the main circuit board. For example, the sound data may include information about a frequency band of a sound, a sound pressure level of the sound, and an amplitude of the sound. The sound driver 1330 may generate sound signals based on the sound data and supply the sound signals to the sound generator 510. For example, the sound driver 1330 may be formed as an integrated circuit.

A side of the flexible film 1390 may be attached onto the upper surface of the display panel 1300 on a lower side of the display panel 1300 by using an anisotropic conductive film. The other side of the flexible film 1390 may be attached onto an upper surface of the display circuit board 1310 on an upper side of the display circuit board 1310 by using an anisotropic conductive film. For example, the flexible film 1390 may be a flexible film that can be bent.

The flexible film 1390 can be omitted, and the display circuit board 1310 can be directly attached to the side of the display panel 1300. In this case, the side of the display panel 1300 may be bent toward a lower surface of the display panel 1300.

The sound generator 510 may be disposed on a surface of the display panel 1300 to vibrate the display panel 1300. The sound generator 510 may be attached onto the lower surface of the display panel 1300 by using an adhesive member such as a pressure sensitive adhesive. For example, the sound generator 510 may be a piezoelectric element or a piezoelectric actuator that vibrates the display panel 1300 by using a piezoelectric material that contracts or expands according to an applied voltage. The sound generator 510 is shaped like a generally rectangular parallelepiped in FIG. 2, but the exemplary embodiments are not limited thereto.

The bottom cover 1800 may be disposed under the display panel 1300 and the sound generator 510. The bottom cover 1800 may form the bottom exterior of the display device 10. The bottom cover 1800 may be formed in a bowl-type shape to accommodate the display panel 1300. Sidewalls of the bottom cover 1800 may contact edges of the cover window 1100. In this case, the sidewalls of the bottom cover 1800 may be attached to the edges of the cover window 1100 through an adhesive member.

Figure 3:
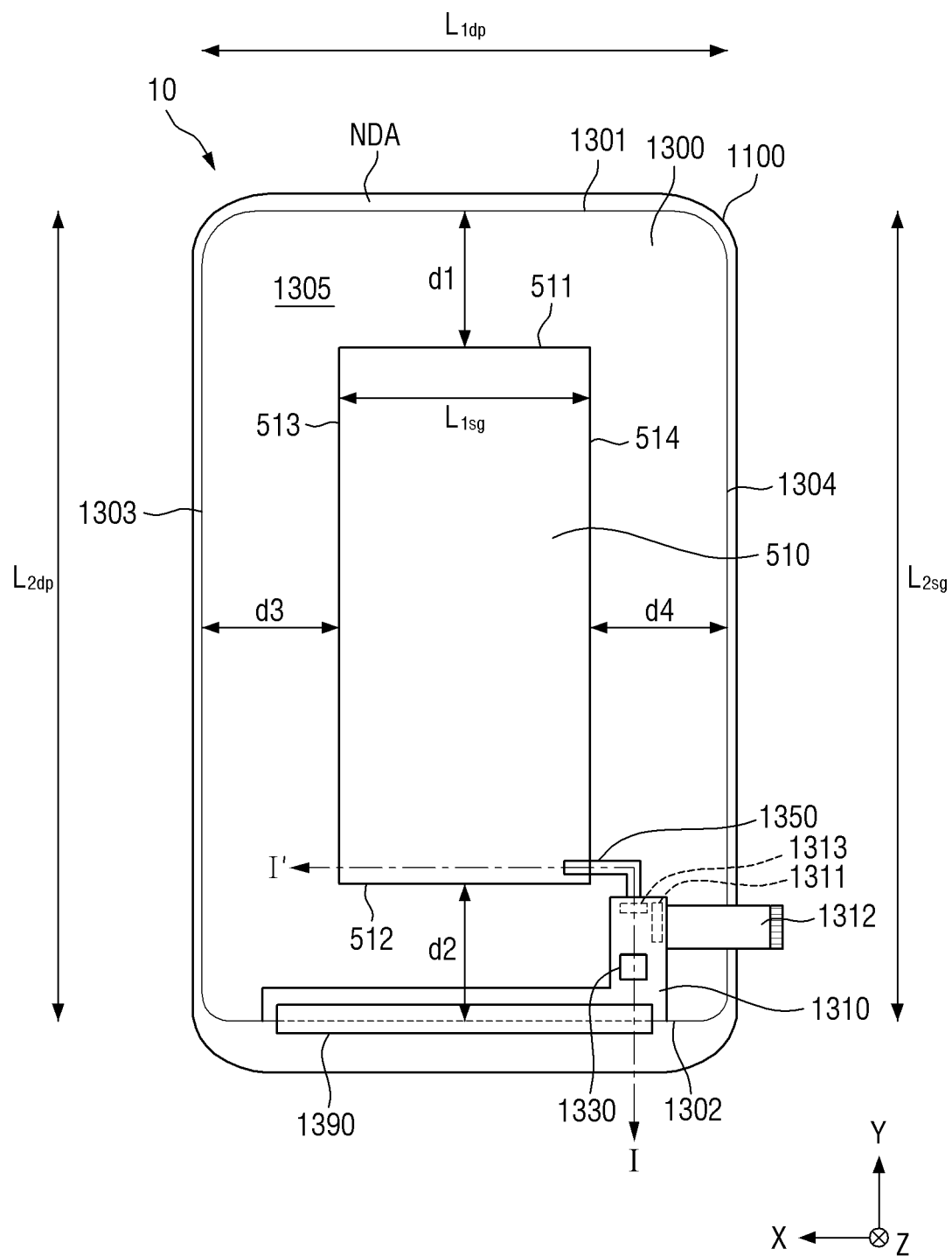
FIG. 3 is a bottom view of the display device of FIG. 2.

FIG. 3 is a bottom view of the display device of FIG. 2.

Referring to FIG. 3, the sound generator 510 may be disposed on the lower surface 1305 of the display panel 1300 and electrically connected to the sound driver 1330 disposed on the display circuit board 1310 through a flexible circuit board 1350. The sound generator 510 may be attached to the lower surface 1305 of the display panel 1300 through an adhesive member such as a pressure sensitive adhesive. Therefore, the sound generator 510 may vibrate the display panel 1300 by vibrating in a thickness direction (Z-axis direction) of the display panel 1300.

The display panel 1300 may include a plurality of side surfaces. For example, the display panel 1300 may include first through fourth side surfaces 1301 through 1304 generally perpendicular or generally parallel to each other. The first side surface 1301 of the display panel 1300 may be an upper side surface of the display panel 1300 in plan view, and the second side surface 1302 may be a lower side surface corresponding to the first side surface 1301. The third side surface 1303 of the display panel 1300 may be a left side surface of the display panel 1300 in plan view, and the fourth side surface 1304 may be a right side surface corresponding to the third side surface 1303. The first and second side surfaces 1301 and 1302 may be generally perpendicular to the third and fourth side surfaces 1303 and 1304, respectively.

The sound generator 510 may include a plurality of side surfaces corresponding to the side surfaces of the display panel 1300, respectively. Therefore, the shape of the sound generator 510 may be determined by the shape of the display panel 1300. For example, the sound generator 510 may include first through fourth side surfaces 511 through 514 corresponding to the first through fourth side surfaces 1301 through 1304 of the display panel 1300, respectively.

Respective distances between the side surfaces of the sound generator 510 and the side surfaces of the display panel 1300 respectively corresponding to the side surfaces of the sound generator 510 may be substantially equal. The respective distances between the first through fourth side surfaces 511 through 514 of the sound generator 510 and the first through fourth side surfaces 1301 through 1304 of the display panel 1300 may be substantially equal. If an error between the respective distances between the side surfaces of the sound generator 510 and the side surfaces of the display panel 1300 is less than about 10%, the respective distances between the side surfaces of the sound generator 510 and the side surfaces of the display panel 1300 may be substantially equal.

For example, a first distance d1 between the first side surface 511 of the sound generator 510 and the first side surface 1301 of the display panel 1300 may be substantially equal to a second distance d2 between the second side surface 512 of the sound generator 510 and the second side surface 1302 of the display panel 1300 (d1=d2). A third distance d3 between the third side surface 513 of the sound generator 510 and the third side surface 1303 of the display panel 1300 may be substantially equal to a fourth distance d4 between the fourth side surface 514 of the sound generator 510 and the fourth side surface 1304 of the display panel 1300 (d3=d4). In addition, the first and second distances d1 and d2 may be substantially equal to the third and fourth distances d3 and d4, respectively (d1=d2=d3=d4). Because the first through fourth distances d1 through d4 are substantially equal, vibrations respectively generated from the first through fourth side surfaces 511 through 514 of the sound generator 510 may respectively reach the first through fourth side surfaces 1301 through 1304 of the display panel 1300 at substantially the same time. In this case, the vibrations respectively reaching the first through fourth side surfaces 1301 through 1304 of the display panel 1300 may have substantially the same amplitude and phase. In addition, the vibrations returning to the sound generator 510 after reaching the first through fourth side surfaces 1301 through 1304 of the display panel 1300 may respectively reach the first through fourth side surfaces 511 through 514 of the sound generator 510 at substantially the same time. Even in this case, the vibrations respectively reaching the first through fourth side surfaces 511 through 514 of the sound generator 510 may have substantially the same amplitude and phase.

Therefore, the display device 10 including the sound generator 510 and the display panel 1300 disposed according to the first through fourth distances d1 through d4 can improve the sound pressure level of a sound output from the display panel 1300. The display device 10 optimizes constructive interference and destructive interference between a plurality of vibrations of the display panel 1300, thereby minimizing distortion of sound to improve a bass reproduction band and enhance the sound pressure level.

For example, a ratio of a length $L_{1sg}$ of the first side surface 511 of the sound generator 510 to a length $L_{2sg}$ of the third side surface 513 generally perpendicular to the first side surface 511 may be substantially equal to a ratio of a length $L_{1dp}$ of the first side surface 1301 of the display panel 1300 corresponding to the first side surface 511 of the sound generator 510 to a length $L_{2dp}$ of the third side surface 1303 generally perpendicular to the first side surface 1301. If an error between the ratio of the respective lengths $L_{1sg}$ and $L_{2sg}$ of the first and third side surfaces 511 and 513 of the sound generator 510 and the ratio of the respective lengths $L_{1dp}$ and $L_{2dp}$ of the first and third side surfaces 1301 and 1303 of the display panel 1300 is less than about 10%, the ratio of the respective lengths $L_{1sg}$ and $L_{2sg}$ of the first and third side surfaces 511 and 513 of the sound generator 510 and the ratio of the respective lengths $L_{1dp}$ and $L_{2dp}$ of the first and third side surfaces 1301 and 1303 of the display panel 1300 may be substantially equal. Because the shape of the sound generator 510 is substantially the same as the shape of the display panel 1300, the distances between the first through fourth side surfaces 511 through 514 of the sound generator 510 and the first through fourth side surfaces 1301 through 1304 of the display panel 1300 may all be substantially equal. Therefore, because the distances d1, d2, d3, and d4 from all the side surfaces of the sound generator 510 to the display panel 1300 are substantially equal, total harmonic distortion (THD) can be minimized, and the sound pressure level of the display device 10 can be improved.

The display circuit board 1310 may be electrically connected to the main circuit board through a cable 1312, and the sound driver 1330 may receive sound data from the main circuit board through the cable 1312. The sound driver 1330 may be disposed on a surface of the display circuit board 1310, and a first connector 1311 and a second connector 1313 may be disposed on the other surface of the display circuit board 1310. For example, the first connector 1311 may include an insertion part connected to a first connection terminal provided at an end of the cable 1312. The second connector 1313 may include an insertion part connected to a connection terminal provided at an end of the flexible circuit board 1350.

The first connection terminal provided at the end of the cable 1312 may be inserted into the insertion part of the first connector 1311. A second connection terminal provided at the other end of the cable 1312 may be inserted into an insertion part of a main connector of the main circuit board.

Figure 4:
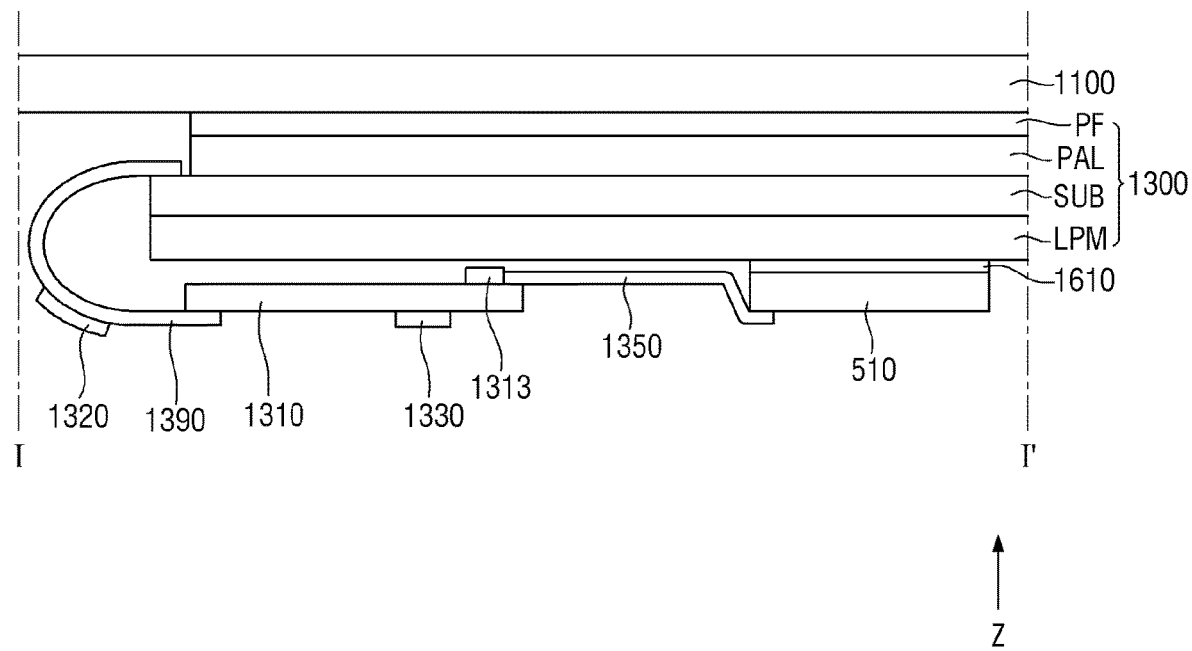
FIG. 4 is a cross-sectional view taken along line I-I' of FIG. 3.
Figure 5:
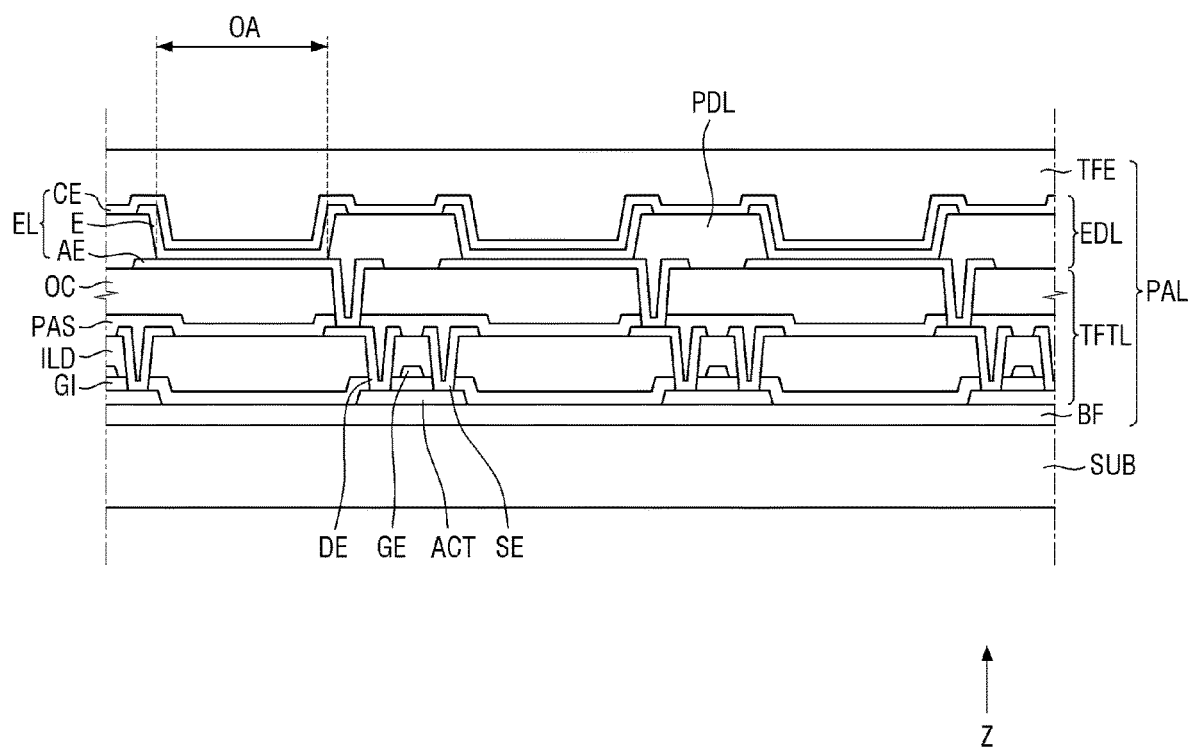
FIG. 5 is a cross-sectional view of the pixel array layer of FIG. 4.

FIG. 4 is a cross-sectional view taken along line I-I' of FIG. 3. FIG. 5 is a cross-sectional view of the pixel array layer of FIG. 4.

Referring to FIGS. 4 and 5, the display panel 1300 may include a substrate SUB, the pixel array layer PAL, a polarizing film PF, and an under-panel member LPM.

The substrate SUB may be a base substrate and may be made of an insulating material such as a polymer resin. For example, the substrate SUB may be a rigid substrate. For another example, the substrate SUB may be a flexible substrate that can be bent, folded, rolled, etc. When the substrate SUB is a flexible substrate, it may be made of a polyimide (PI), but the exemplary embodiments are not necessarily limited thereto.

The pixel array layer PAL may be disposed on the substrate SUB. The pixel array layer PAL may display an image by including a plurality of pixels connected to a plurality of data lines and a plurality of gate lines, respectively. The pixel array layer PAL may include a buffer layer BF, a thin-film transistor layer TFTL, a light emitting element layer EDL, and an encapsulation layer TFE.

The buffer layer BF may be disposed on the substrate SUB. The buffer layer BF may be composed of inorganic layers that can prevent introduction of air or moisture. For example, the buffer layer BF may include a plurality of inorganic stacked alternately. The buffer layer BF may be a multilayer in which one or more inorganic layers selected from a on nitride layer, a silicon oxynitride layer, a silicon oxide layer, a titanium oxide layer, an an aluminum oxide layer are alternately stacked, but the exemplary embodiments are not necessarily limited thereto.

The thin-film transistor layer TFTL may include thin-film transistors, a gate insulating layer GI, an interlayer insulating film ILD, a passivation layer PAS, and a planarization layer OC. The thin-film transistors may be disposed on the buffer layer BF to form pixel circuits of the pixels. For example, the thin-film transistors may be driving transistors or switching transistors of the pixel circuits. Each of the thin-film transistors may include a semiconductor layer ACT, a gate electrode GE, a source electrode SE, and a drain electrode DE.

The semiconductor layer ACT may be provided on the buffer layer BF. The semiconductor layer ACT may be overlapped by the gate electrode GE, the source electrode SE, and the drain electrode DE. The semiconductor layer ACT may directly contact the source electrode SE and the drain electrode DE and may face the gate electrode GE with the gate insulating layer GI interposed between them.

The gate electrode GE may be disposed on the gate insulating layer GI. The gate electrode GE may overlap the semiconductor layer ACT with the gate insulating layer GI interposed between them.

The source electrode SE and the drain electrode DE may be disposed on the interlayer insulating film ILD to be spaced apart from each other. The source electrode SE may contact an end of the semiconductor layer ACT through a contact hole provided in the gate insulating layer GI and the interlayer insulting film ILD. The drain electrode DE may contact the other end of the semiconductor layer ACT through a contact hole provided in the gate insulating layer GI and the interlayer insulating film ILD. The drain electrode DE may be connected to an anode AE of each light emitting element EL.

The gate insulating layer GI may be provided on the semiconductor layers ACT. For example, the gate insulating layer GI may be disposed on the semiconductor layers ACT and the buffer layer BF and may insulate the semiconductor layers ACT from the gate electrodes GE. The gate insulating layer GI may include contact holes through which the source electrodes SE pass and contact holes through which the drain electrodes DE pass.

The interlayer insulating film ILD may be disposed on the gate electrodes GE. For example, the interlayer insulating film ILD may include contact holes through which the source electrodes SE pass and contact holes through which the drain electrodes DE pass. Here, the contact holes of the interlayer insulating film ILD may be connected to the contact holes of the gate insulating layer GI.

The passivation layer PAS may be provided on the thin-film transistors to protect the thin-film transistors. For example, the passivation layer PAS may include contact holes through which the anodes AE of the light emitting elements EL pass.

The planarization layer OC may be provided on the passivation layer PAS to planarize upper surfaces of the thin-film transistors. For example, the planarization layer OC may include contact holes through which the anodes AE of the light emitting elements EL pass.

The light emitting element layer EDL may include the light emitting elements EL and a pixel defining layer PDL. The light emitting elements EL may be provided on the thin-film transistors. Each of the light emitting elements EL may include the anode AE, a light emitting layer E, and a cathode CE. The anode AE may be provided on the planarization layer OC. For example, the anode AE may be disposed to overlap each opening area OA defined by the pixel defining layer PDL. In addition, the anode AE may be connected to the drain electrode DE of each thin-film transistor.

The light emitting layer E may be provided on the anode AE. The light emitting layer E may include a hole injection layer, a hole transport layer, a light receiving layer, an electron blocking layer, an electron transport layer, an electron injection layer, etc. For example, the light emitting layer E may be an organic light emitting layer made of an organic material, but the exemplary embodiments are not necessarily limited thereto. When the light emitting layer E is an organic light emitting layer, a thin-film transistor may apply a predetermined voltage to the anode AE of a light emitting element EL, and the cathode CE of the light emitting element EL may receive a common voltage or a cathode voltage. In addition, holes and electrons may move to the organic light emitting layer E respectively through the hole transport layer and the electron transport layer and combine in the organic light emitting layer E to emit light.

The cathode CE may be provided on the light emitting layer E. For example, the cathode CE may be implemented as an electrode common to all pixels without distinction between the pixels. For example, the cathode CE may be disposed on the light emitting layer E in each opening area OA and disposed on the pixel defining layer PDL in each non-opening area. The pixel defining layer PDL may define the opening areas OA. The pixel defining layer PDL may separate and insulate the respective anodes AE of the light emitting elements EL from each other.

The encapsulation layer TFE may be disposed on the cathode CE to cover the light emitting elements EL. The encapsulation layer TFE may prevent oxygen or moisture from penetrating into the light emitting elements EL.

The polarizing film PF may be disposed on the pixel array layer PAL to prevent a decrease in visibility due to reflection of external light. The polarizing film PF may include a linear polarizer and a retardation film such as a quarter-wave ($\lambda/4$) plate. For example, the retardation film may be disposed on the pixel array layer PAL, and the linear polarizer may be disposed between the retardation film and the cover window 1100.

The under-panel member LPM may be disposed on a lower surface of the substrate SUB. The under-panel member LPM may include at least one of a light absorbing member for absorbing light incident from the outside, a buffer member for absorbing external impact, and a heat dissipating member for efficiently dissipating the heat of the display panel 1300.

The light absorbing member may be disposed under the display panel 1300. The light absorbing member blocks transmission of light to prevent elements disposed under the light absorbing member, for example, the display circuit board 1310, the sound generator 510, etc. from being seen from above the display panel 1300.

The buffer member may be disposed under the light absorbing member. The buffer member may absorb external impact to prevent the display panel 1300 from being damaged. For example, the buffer member may be made of a polymer resin or a material having elasticity. The heat dissipating member may be disposed under the buffer member. The heat dissipating member may include a material capable of shielding electromagnets waves and having excellent thermal conductivity.

Alternatively, the under-panel member LPM may be omitted. When the under-panel member LPM is omitted, the display circuit board 1310 and the sound generator 510 may be disposed on the lower surface of the substrate SUB. The cover window 1100 may be disposed on the polarizing film PF to protect the upper surface of the display panel 1300. The display driver 1320 may be disposed on the flexible film 1390 to supply signals and voltages for driving the display panel 1300.

A side of the flexible film 1390 may be attached to a side of the substrate SUB, and the other side of the flexible film 1390 may be attached to a side of the display circuit board 1310. The side of the flexible film 1390 may be attached to a surface of the substrate SUB by using an anisotropic conductive film. The other side of the flexible film 1390 may be attached to a surface of the display circuit board 1310 by using an anisotropic conductive film. The other surface opposite the surface of the display circuit board 1310 may face the under-panel member LPM.

The sound driver 1330 may be disposed on the surface of the display circuit board 1310, and the second connector 1313 may be disposed on the other surface of the display circuit board 1310. The second connector 1313 may include the insertion part connected to the connection terminal provided at an end of the flexible circuit board 1350.

The sound generator 510 may be attached to a lower surface of the under-panel member LPM by an adhesive member 1610 and may vibrate the display panel 1300. The sound generator 510 may output sound by vibrating the display panel 1300. For example, the adhesive member 1610 may be a pressure sensitive adhesive. The sound generator 510 may be electrically connected to the sound driver 1330 through the flexible circuit board 1350.

Figure 6:
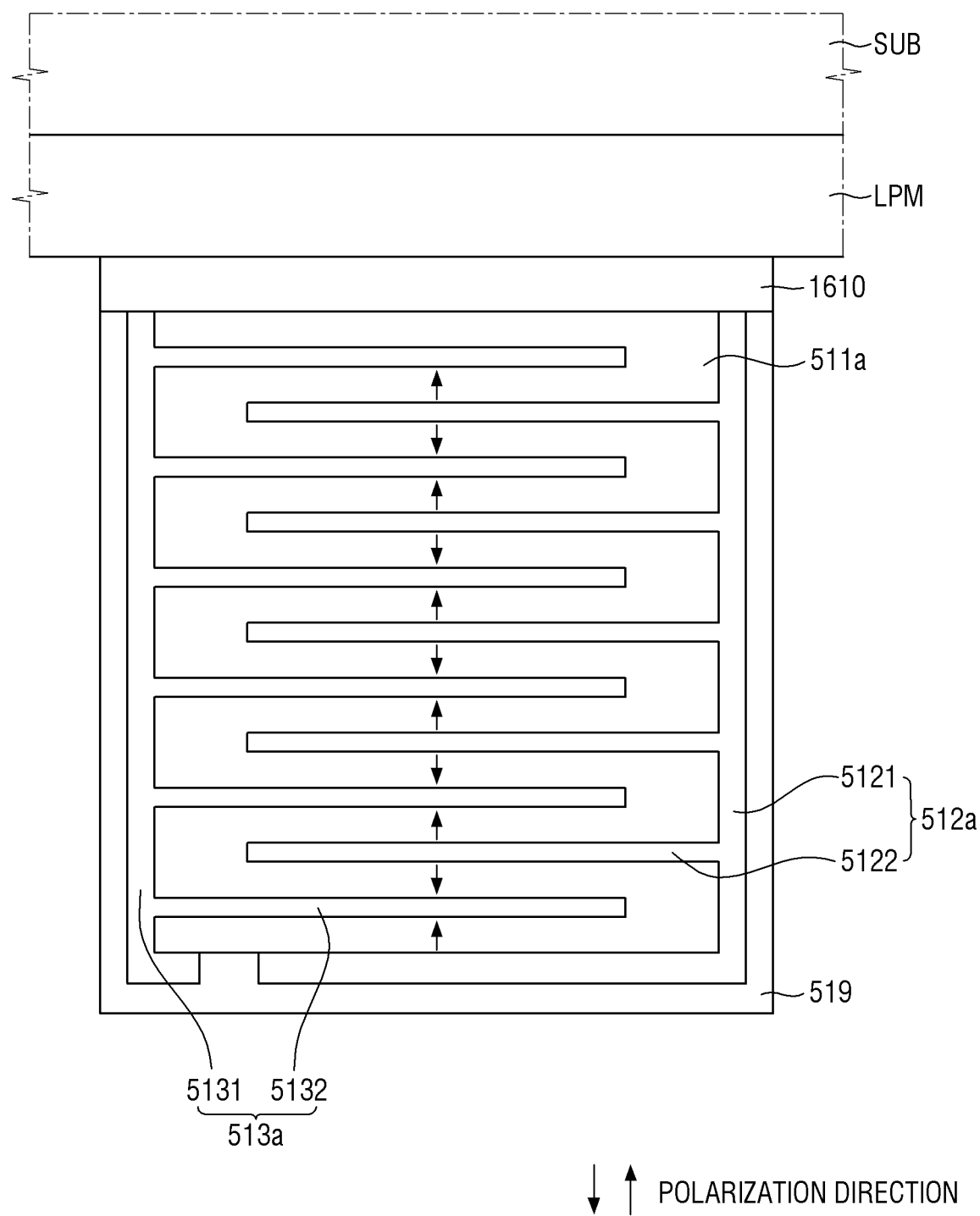
FIG. 6 is a cross-sectional view of the sound generator of FIG. 3.
Figure 7:
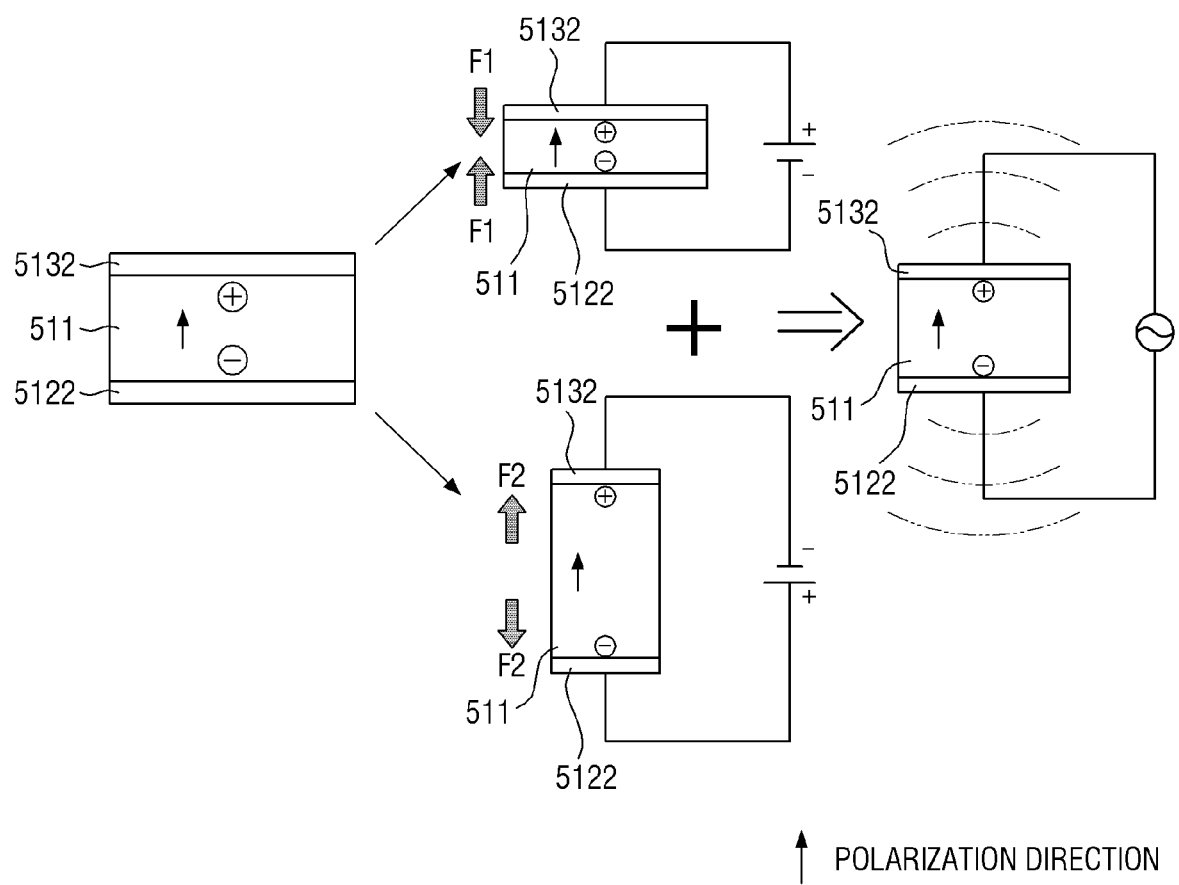
FIG. 7 illustrates an exemplary process for vibrating a vibration layer disposed between first and second branch electrodes of the sound generator of FIG. 6.

FIG. 6 is a cross-sectional view of the sound generator of FIG. 3. FIG. 7 illustrates an exemplary process for vibrating a vibration layer disposed between first and second branch electrodes of the sound generator of FIG. 6.

Referring to FIGS. 3, 6 and 7, the sound generator 510 may be a piezoelectric element or a piezoelectric actuator that vibrates the display panel 1300 using a piezoelectric material that contracts or expands according to an applied voltage. The sound generator 510 may include a vibration layer 511*a*, a first electrode 512*a*, and a second electrode 513*a*.

The vibration layer 511*a* may be a piezoelectric element that is deformed according to a driving voltage applied to the first electrode 512*a* and a driving voltage applied to the second electrode 513*a*. In this case, the vibration layer 511*a* may be any one of a piezoelectric material, such as a polyvinylidene fluoride (PVDF) film or a plumbum zirconate titanate (PZT), and an electroactive polymer.

Because the production temperature of the vibration layer 511*a* is high, the first electrode 512*a* and the second electrode 513*a* may be made of silver (Ag) having a high melting point or an alloy of Ag and palladium (Pd). When the first electrode 512*a* and the second electrode 513*a* are made of an alloy of Ag and Pd, the Ag content may be higher than the Pd content.

The vibration layer 511*a* may be disposed between each pair of the first and second branch electrodes 5122 and 5132. For example, the vibration layer 511*a* may contract or expand according to the difference between the driving voltage applied to each first branch electrode 5122 and the driving voltage applied to a corresponding second branch electrode 5132.

The first electrode 512*a* and the second electrode 513*a* may be connected to pads of the flexible circuit board 1350. The pads of the flexible circuit board 1350 may be connected to the first electrode 512*a* and the second electrode 513*a* exposed on a surface of the sound generator 510.

The first electrode 512*a* may include a first stem electrode 5121 and the first branch electrodes 5122. For example, the first stem electrode 5121 may be disposed on at least one side surface of the vibration layer 511*a*. For another example, the first stem electrode 5121 may penetrate a part of the vibration layer 511*a*. For another example, the first stem electrode 5121 may be disposed on an upper surface of the vibration layer 511*a*. The first branch electrodes 5122 may branch from the first stem electrode 5121. The first branch electrodes 5122 may be arranged generally parallel to each other.

The second electrode 513*a* may include a second stem electrode 5131 and the second branch electrodes 5132. The second electrode 513*a* may be spaced apart from the first electrode 512*a*. The second electrode 513*a* may be electrically insulated from the first electrode 512*a*. The second stem electrode 5131 may be disposed on at least one side surface of the vibration layer 511*a*. For example, the first stem electrode 5121 may be disposed on a side surface of the vibration layer 511*a*, and the second stem electrode 5131 may be disposed on the other side surface of the vibration layer 511*a*. For another example, the second stem electrode 5131 may penetrate a part of the vibration layer 511*a*. For another example, the second stem electrode 5131 may be disposed on the upper surface of the vibration layer 511*a*. The second branch electrodes 5132 may branch from the second stem electrode 5131. The second branch electrodes 5132 may be arranged generally parallel to each other.

The first branch electrodes 5122 and the second branch electrodes 5132 may be alternately disposed in a vertical direction (Z-axis direction). For example, the first branch electrodes 5122 and the second branch electrodes 5132 may be repeatedly disposed in the vertical direction (Z-axis direction) in the order of the first branch electrode 5122, the second branch electrode 5132, the first branch electrode 5122, and the second branch electrode 5132.

For another example, the first branch electrodes 5122 and the second branch electrodes 5132 may be disposed generally parallel to each other in a generally horizontal direction (X-axis direction or Y-axis direction).

In FIG. 6, when the polarization direction of the vibration layer 511*a* disposed between a first branch electrode 5122 and a second branch electrode 5132 disposed above the first branch electrode 5122 is a generally upward direction (↑), the vibration layer 511*a* may have a positive polarity in an upper area adjacent to the second branch electrode 5132 and a negative polarity in a lower area adjacent to the first branch electrode 5122. For another example, when the polarization direction of the vibration layer 511*a* disposed between a first branch electrode 5122 and a second branch electrode 5132 disposed under the first branch electrode 5122 is a generally downward direction (↓), the vibration layer 511*a* may have a negative polarity in an upper area adjacent to the first branch electrode 5122 and a positive polarity in a lower area adjacent to the second branch electrode 5132. The polarization direction of the vibration layer 511*a* may be determined by a poling process in which an electric field is applied to the vibration layer 511*a* using a first branch electrode 5122 and a second branch electrode 5132.

In FIG. 7, when the polarization direction of the vibration layer 511*a* disposed between a first branch electrode 5122 and a second branch electrode 5132 disposed above the first branch electrode 5122 is the generally upward direction (↑), if a negative driving voltage is applied to the first branch electrode 5122 and a positive driving voltage is applied to the second branch electrode 5132, the vibration layer 511*a* may contract according to a first force F1. The first force F1 may be a contractile force. For another example, when the polarization direction of the vibration layer 511*a* is the generally upward direction (↑), if a positive driving voltage is applied to the first branch electrode 5122 and a negative driving voltage is applied to the second branch electrode 5132, the vibration layer 511*a* may expand according to a second force F2. The second force F2 may be a stretching force.

In a different example from FIG. 7, when the polarization direction of the vibration layer 511*a* disposed between a first branch electrode 5122 and a second branch electrode 5132 disposed above the first branch electrode 5122 is the generally downward direction (↓), if a negative driving voltage is applied to the first branch electrode 5122 and a positive driving voltage is applied to the second branch electrode 5132, the vibration layer 511*a* may expand according to a stretching force. For another example, when the polarization direction of the vibration layer 511*a* is the generally downward direction (↓), if a positive driving voltage is applied to the first branch electrode 5122 and a negative driving voltage is applied to the second branch electrode 5132, the vibration layer 511*a* may contract according to a contractile force.

Therefore, when the driving voltage applied to the first electrode 512*a* and the driving voltage applied to the second electrode 513*a* repeatedly alternate between the positive polarity and the negative polarity, the vibration layer 511*a* may repeatedly contract and expand. The sound generator 510 may be vibrated by repetition of contraction and expansion of the vibration layer 511*a*. When the vibration layer 511*a* of the sound generator 510 vibrates, the display panel 1300 may vibrate in a third direction (Z-axis direction), which is the thickness direction of the display panel 300, due to stress. The display panel 1300 vibrated by the sound generator 510 may output sound.

The sound generator 510 may further include a protective layer 519 surrounding lower and side surfaces. For example, the protective layer 519 may include an insulating material or the same material as the vibration layer 511*a*. The protective layer 519 may be disposed on the first electrode 512*a*, the second electrode 513*a*, and the vibration layer 511*a* exposed without being covered by the first electrode 512*a* and the second electrode 513*a*. The protective layer 519 may surround and protect the vibration layer 511*a*, the first electrode 512*a* and the second electrode 513*a*, but may also be omitted.

Figure 8:
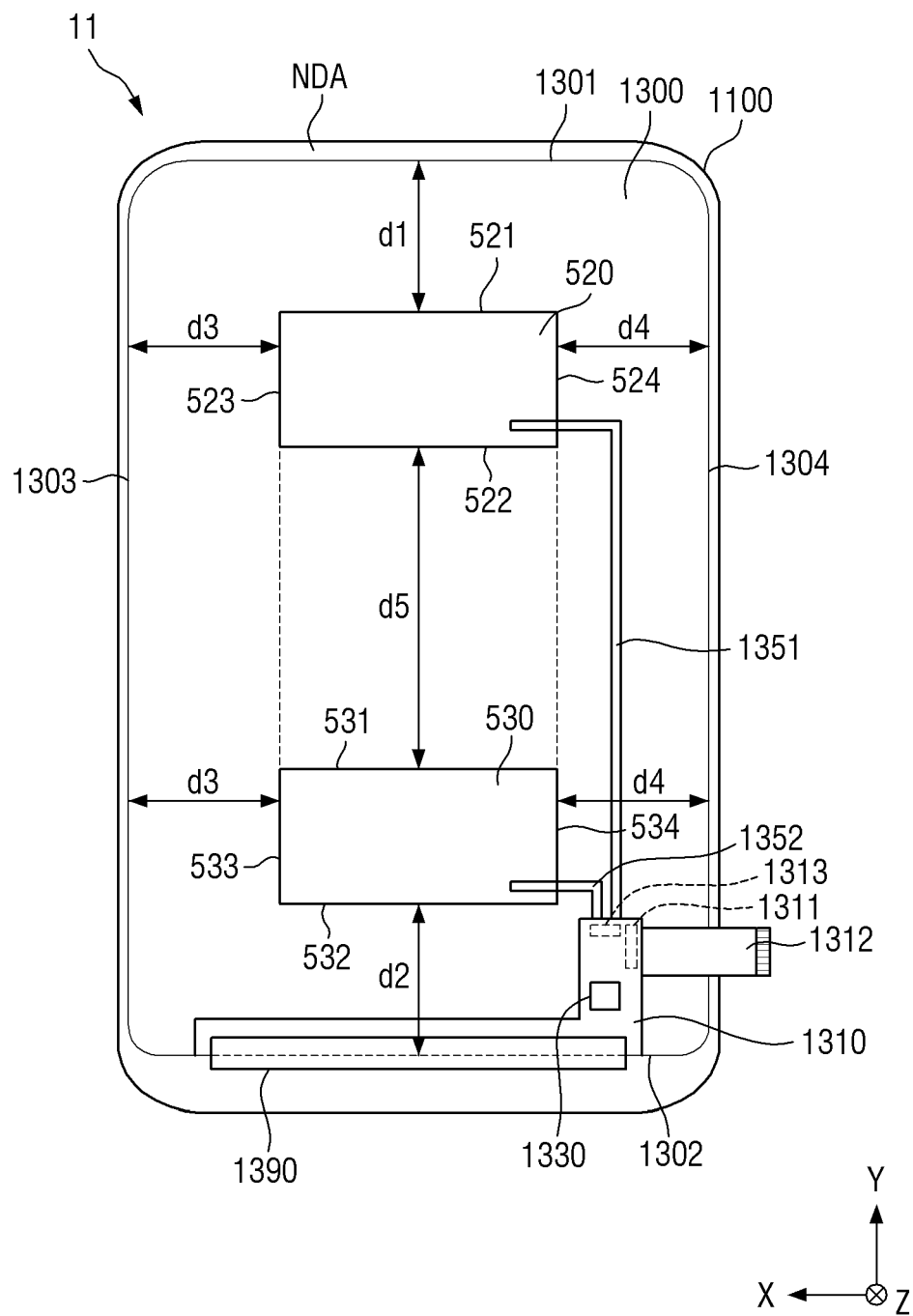
FIG. 8 is a bottom view of another exemplary embodiment of the display device of FIG. 2.

FIG. 8 is a bottom view of another exemplary embodiment of the display device of FIG. 2. A display device 11 of FIG. 8 is different from the display device 10 of FIG. 3 in the configuration of the sound generator 510. Thus, a description of the same elements as those described above will be given briefly or omitted to avoid redundancy.

Referring to FIG. 8, the display device 11 may include a plurality of sound generators, each including one or more side surfaces respectively corresponding to a plurality of side surfaces of a display panel 1300. For example, the sound generators may include first and second sound generators 520 and 530. The first and second sound generators 520 and 530 may be spaced apart from each other in a direction generally perpendicular to first and second side surfaces 1301 and 1302 of the display panel 1300. Therefore, the first and second sound generators 520 and 530 may be spaced apart from each other in the second direction (Y-axis direction).

The first and second sound generators 520 and 530 may be disposed on a lower surface of the display panel 1300. The first and second sound generators 520 and 530 may be electrically connected to a sound driver 1330 on a display circuit board 1310 through first and second flexible circuit boards 1351 and 1352, respectively. The first and second sound generators 520 and 530 may be attached to the lower surface of the display panel 1300 through an adhesive member such as a pressure sensitive adhesive. Therefore, the first and second sound generators 520 and 530 may vibrate the display panel 1300 by vibrating in the thickness direction (Z-axis direction) of the display panel 1300.

The display panel 1300 may include a plurality of side surfaces, for example, first through fourth side surfaces 1301 through 1304 generally perpendicular or generally parallel to each other. The first side surface 1301 of the display panel 1300 may be an upper side surface of the display panel 1300 in plan view, and the second side surface 1302 may be a lower side surface corresponding to the first side surface 1301. The third side surface 1303 of the display panel 1300 may be a left side surface of the display panel 1300 in plan view, and the fourth side surface 1304 may be a right side surface corresponding to the third side surface 1303. The first and second side surfaces 1301 and 1302 may be generally perpendicular to the third and fourth side surfaces 1303 and 1304, respectively.

Each of the first and second sound generators 520 and 530 may include one or to more side surfaces corresponding to the side surfaces of the display panel 1300, respectively. For example, the first sound generator 520 may include first through fourth side surfaces 521 through 524, and the second sound generator 530 may include first through fourth side surfaces 531 through 534. The first, third and fourth side surfaces 521, 523 and 524 of the first sound generator 520 may correspond to the first, third and fourth side surfaces 1301, 1303 and 1304 of the display panel 1300, respectively. The second through fourth side surfaces 532 through 534 of the second sound generator 530 may correspond to the second through fourth side surfaces 1302 through 1304 of the display panel 1300, respectively.

Respective distances between the side surfaces of the display panel 1300 and the side surfaces of each of the first and second sound generators 520 and 530 respectively corresponding to the side surfaces of the display panel 1300 may be substantially equal. If an error between the respective distances between the side surfaces of each of the first and second sound generators 520 and 530 and the side surfaces of the display panel 1300 is less than about 10%, the respective distances between the side surfaces of each of the first and second sound generators 520 and 530 and the side surfaces of the display panel 1300 may be substantially equal. For example, a first distance d1 between the first side surface 521 of the first sound generator 520 and the first side surface 1301 of the display panel 1300 may be substantially equal to a second distance d2 between the second side surface 532 of the second sound generator 530 and the second side surface 1302 of the display panel 1300 (d1=d2). A third distance d3 between the third side surface 523 or 533 of the first or second sound generator 520 or 530 and the third side surface 1303 of the display panel 1300 may be substantially equal to a fourth distance d4 between the fourth side surface 524 or 534 of the first or second sound generator 520 or 530 and the fourth side surface 1304 of the display panel 1300 (d3=d4). In addition, the first and second distances d1 and d2 may be substantially equal to the third and fourth distances d3 and d4, respectively (d1=d2=d3=d4).

Because the first through fourth distances d1 through d4 are substantially equal, vibrations respectively generated from the first, third and fourth side surfaces 521, 523 and 524 of the first sound generator 520 and vibrations respectively generated from the second through fourth side surfaces 532 through 534 of the second sound generator 530 may respectively reach the first through fourth side surfaces 1301 through 1304 of the display panel 1300 at substantially the same time. In this case, the vibrations respectively reaching the first through fourth side surfaces 1301 through 1304 of the display panel 1300 may have substantially the same amplitude and phase. In addition, the vibrations respectively returning to the first and second sound generators 520 and 530 after reaching the first through fourth side surfaces 1301 through 1304 of the display panel 1300 may respectively reach the first and second sound generators 520 and 530 at substantially the same time. Even in this case, the vibrations respectively reaching the first and second sound generators 520 and 530 may have substantially the same amplitude and phase.

Therefore, the display device 11 including the first and second sound generators 520 and 530 and the display panel 1300 disposed according to the first through fourth distances d1 through d4 can improve the sound pressure level of a sound output from the display panel 1300. The display device 11 optimizes constructive interference and destructive interference between a plurality of vibrations of the display panel 1300, thereby minimizing distortion of sound to improve a bass reproduction band and enhance the sound pressure level.

For example, the display device 11 may include a sound generating area including the first and second sound generators 520 and 530 and a space between the first and second sound generators 520 and 530. A ratio of lengths of a first side surface and a third side surface of the sound generating area may be substantially equal to a ratio of lengths of the first side surface 1301 and the third side surface 1303 of the display panel 1300. If an error between the ratio of the respective lengths of the first and third side surfaces of the sound generating area and the ratio of the respective lengths of the first and third side surfaces 1301 and 1303 of the display panel 1300 is less than about 10%, the ratio of the respective lengths of the first and third side surfaces of the sound generating area and the ratio of the respective lengths of the first and third side surfaces 1301 and 1303 of the display panel 1300 may be substantially equal.

Because the shape of the sound generating area is substantially the same as the shape of the display panel 1300, distances between a plurality of side surfaces of the sound generating area and the first through fourth side surfaces 1301 through 1304 of the display panel 1300 may all be substantially equal. Therefore, because the distances from all the side surfaces of the sound generating area to the display panel 1300 are substantially equal, THD can be minimized, and the sound pressure level of the display device 11 can be improved.

Each of the first through fourth distances d1 through d4 may be smaller than a fifth distance d5 between the first and second sound generators 520 and 530. For example, the distance d5 between the first and second sound generators 520 and 530 may be greater than the first distance d1 between the first side surface 521 of the first sound generator 520 and the first side surface 1301 of the display panel 1300 (d5>d1). The fifth distance d5 between the first and second sound generators 520 and 530 may be greater than the second distance d2 between the second side surface 532 of the second sound generator 530 and the second side surface 1302 of the display panel 1300 (d5>d2). The fifth distance d5 between the first and second sound generators 520 and 530 may be greater than the third distance d3 between the third side surface 523 or 533 of the first or second sound generator 520 or 530 and the third side surface 1303 of the display panel 1300 (d5>d3). The fifth distance d5 between the first and second sound generators 520 and 530 may be greater than the fourth distance d4 between the fourth side surface 524 or 534 of the first or second sound generator 520 or 530 and the fourth side surface 1304 of the display panel 1300. Because the first and second sound generators 520 and 530 are spaced apart from each other by a distance greater than the distance from the display panel 1300, vibration interference between the first and second sound generators 520 and 530 can be minimized. Therefore, the display device 11 including the first and second sound generators 520 and 530 spaced apart from each other by the fifth distance d5 greater than the first through fourth distances d1 through d4 can minimize distortion of sound and improve the sound pressure level.

Figure 9:
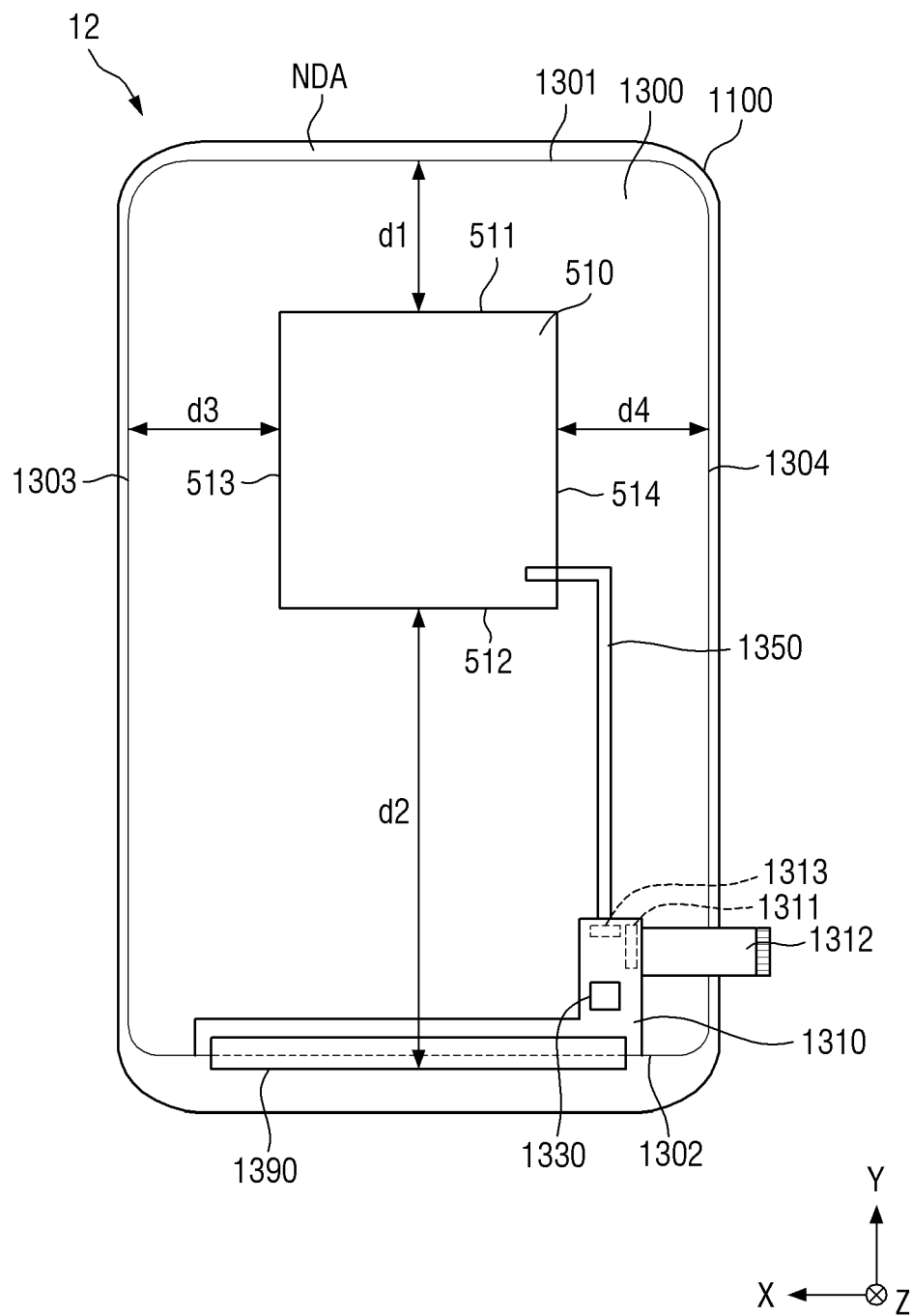
FIG. 9 is a bottom view of still another exemplary embodiment of the display device of FIG. 2.

FIG. 9 is a bottom view of still another exemplary embodiment of the display device of FIG. 2. The display device 12 of FIG. 9 is different from the display device 10 of FIG. 3 in the configuration of the sound generator 510. Thus, a description of the same elements as those described above will be given briefly or omitted to avoid redundancy.

Referring to FIG. 9, the display device 12 may include a display panel 1300 and a sound generator 510. The display panel 1300 may include first through fourth side surfaces 1301 through 1304 generally perpendicular or generally parallel to each other. The sound generator 510 may include first through fourth side surfaces 511 through 514 corresponding to the first through fourth side surfaces 1301 through 1304 of the display panel 1300, respectively.

Respective distances between the first, third and fourth side surfaces 511, 513 and 514 of the sound generator 510 and the first, third and fourth side surfaces 1301, 1303 and 1304 of the display panel 1300 may be substantially equal. If an error between the respective distances d1, d3, and d4 between the first, third and fourth side surfaces 511, 513 and 514 of the sound generator 510 and the first, third and fourth side surfaces 1301, 1303 and 1304 of the display panel 1300 is less than about 10%, the respective distances between the first, third and fourth side surfaces 511, 513 and 514 of the sound generator 510 and the first, third and fourth side surfaces 1301, 1303 and 1304 of the display panel 1300 may be substantially equal.

The second side surface 512 of the sound generator 510 may face at least one of a display circuit board 1310, a sound driver 1330, and a flexible film 1390. For example, a first distance d1 between the first side surface 511 of the sound generator 510 and the first side surface 1301 of the display panel 1300 may be substantially equal to a third distance d3 between the third side surface 513 of the sound generator 510 and the third side surface 1303 of the display panel 1300 (d1=d3). The third distance d3 between the third side surface 513 of the sound generator 510 and the third side surface 1303 of the display panel 1300 may be substantially equal to a fourth distance d4 between the fourth side surface 514 of the sound generator 510 and the fourth side surface 1304 of the display panel 1300 (d3=d4). Therefore, the first, third and fourth distances d1, d3 and d4 may be substantially equal to each other.

Because the first, third and fourth distances d1, d3 and d4 are substantially equal, vibrations respectively generated from the first, third and fourth side surfaces 511, 513 and 514 of the sound generator 510 may respectively reach the first, third and fourth side surfaces 1301, 1303 and 1304 of the display panel 1300 at substantially the same time. In this case, the vibrations respectively reaching the first, third and fourth side surfaces 1301, 1303 and 1304 of the display panel 1300 may have substantially the same amplitude and phase. In addition, the vibrations returning to the sound generator 510 after reaching the first, third and fourth side surfaces 1301, 1303 and 1304 of the display panel 1300 may respectively reach the first, third and fourth side surfaces 511, 513 and 514 of the sound generator 510 at substantially the same time. Even in this case, the vibrations respectively reaching the first, third and fourth side surfaces 511, 513 and 514 of the sound generator 510 may have substantially the same amplitude and phase.

A second distance d2 between the second side surface 512 of the sound generator 510 and the second side surface 1302 of the display panel 1300 may be greater than the first distance d1 between the first side surface 511 of the sound generator 510 and the first side surface 1301 of the display panel 1300. The second distance d2 may be greater than the first distance d1 due to a space in which a battery, the display circuit board 1310, the sound driver 1330, and the flexible film 1390 of the display device 12 are accommodated. Therefore, the display device 12 including the sound generator 510 and the display panel 1300 disposed according to the first through fourth distances d1 through d4 can improve the sound pressure level of sound while remaining slim.

Figure 10:
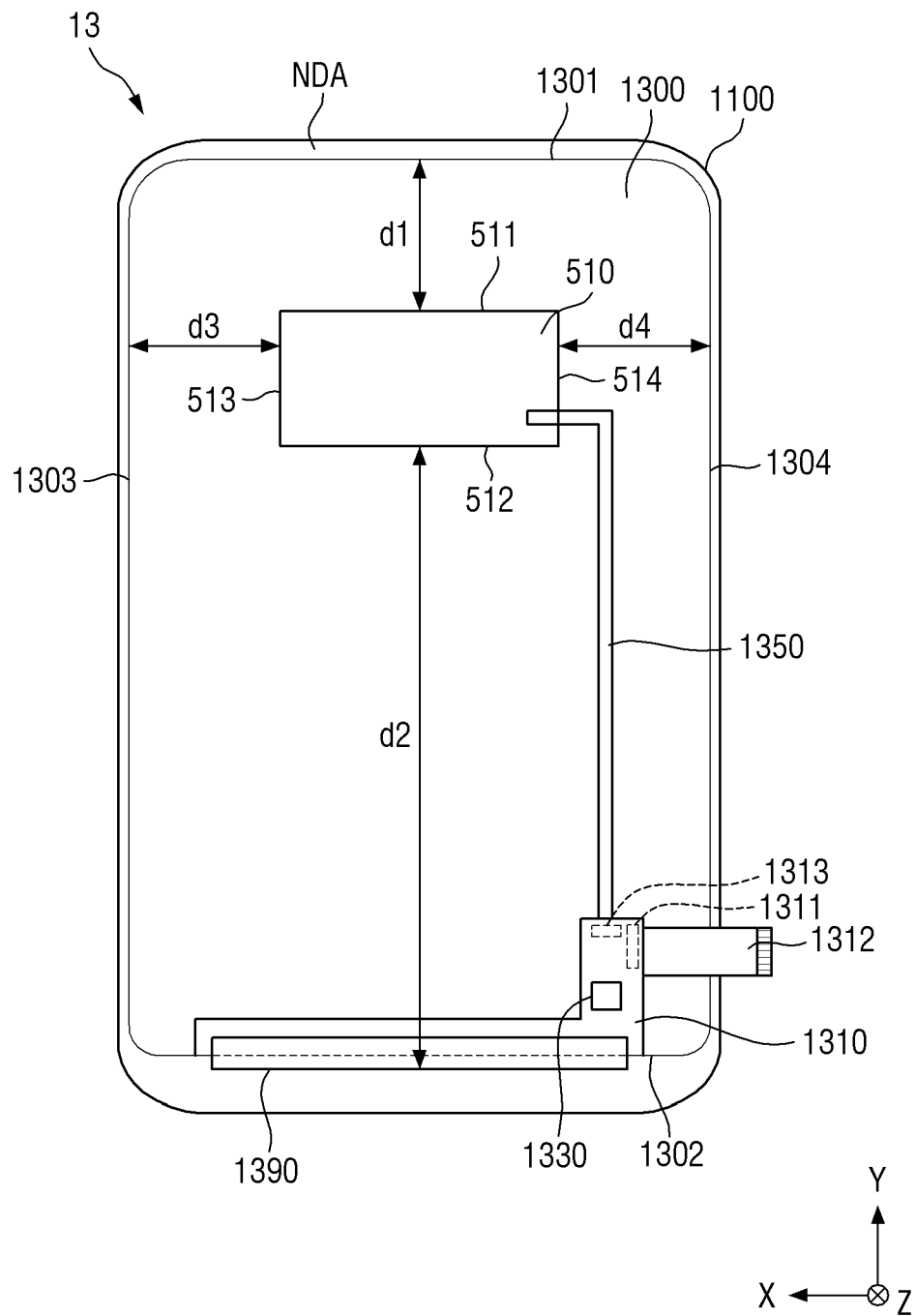
FIG. 10 is a bottom view of a further exemplary embodiment of the display device of FIG. 2.
Figure 11:
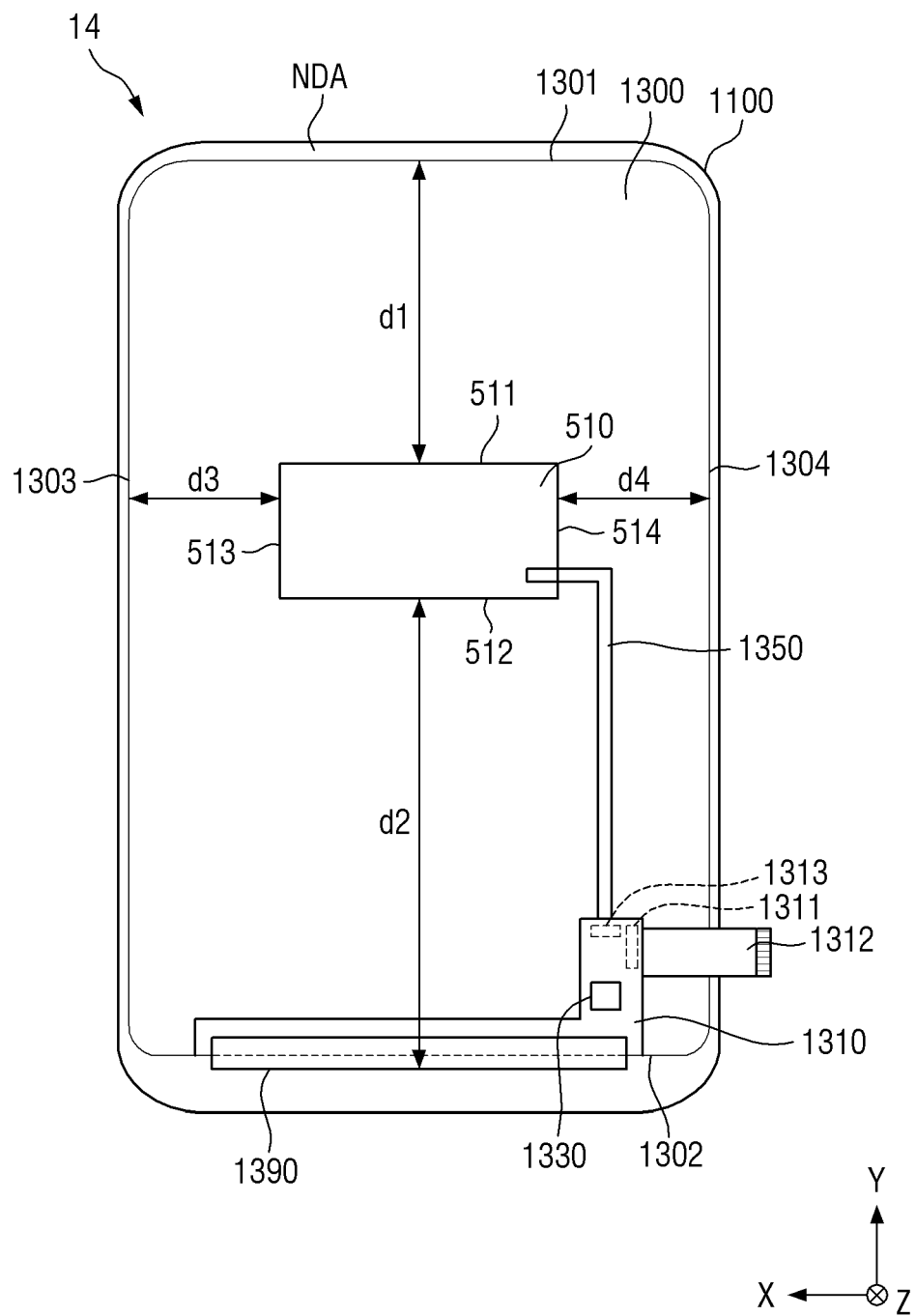
FIG. 11 is a bottom view of still further exemplary embodiment of the display device of FIG. 2.
Figure 12:
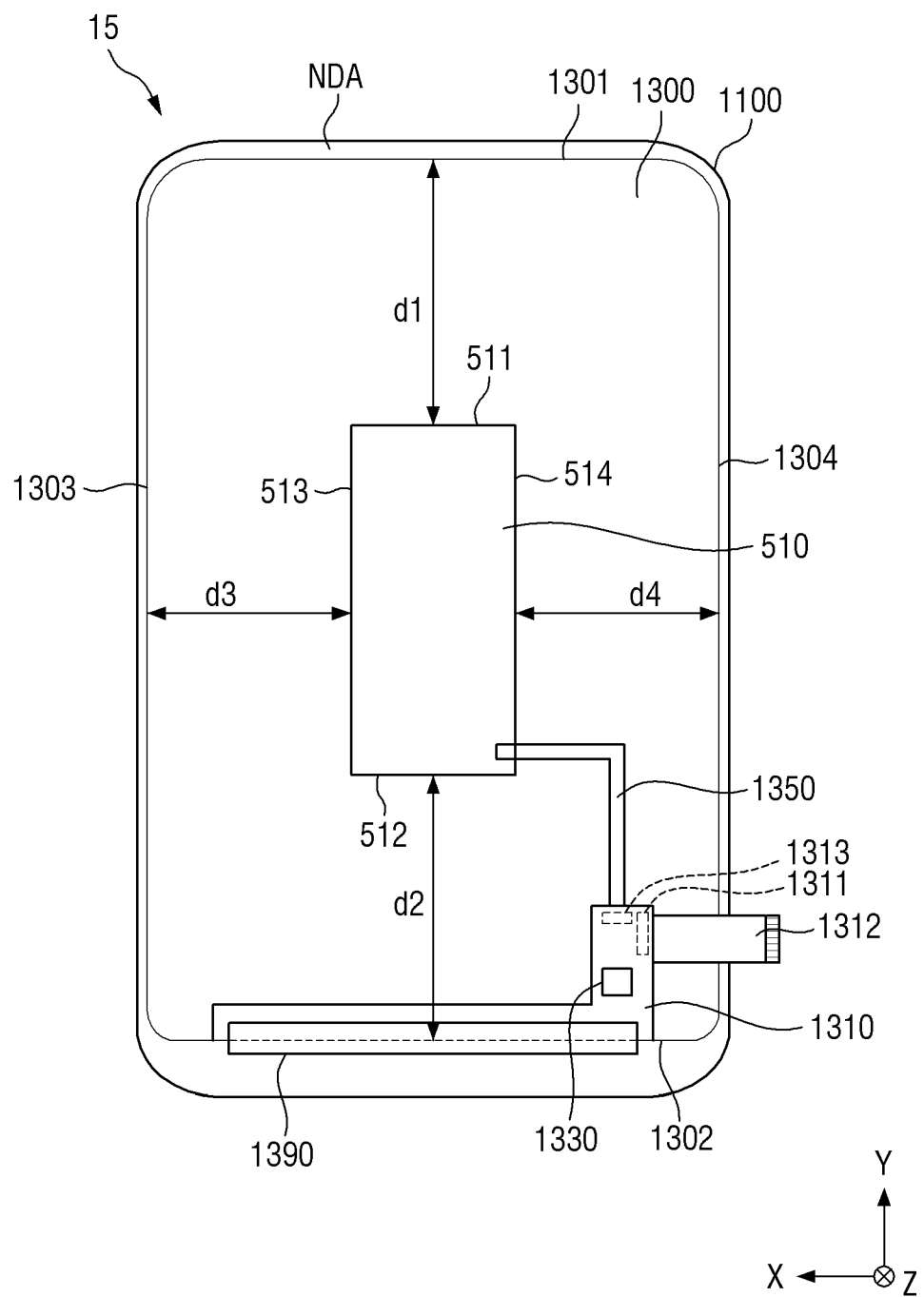
FIG. 12 is a bottom view of yet another exemplary embodiment of the display device of FIG. 2.
Figure 13:
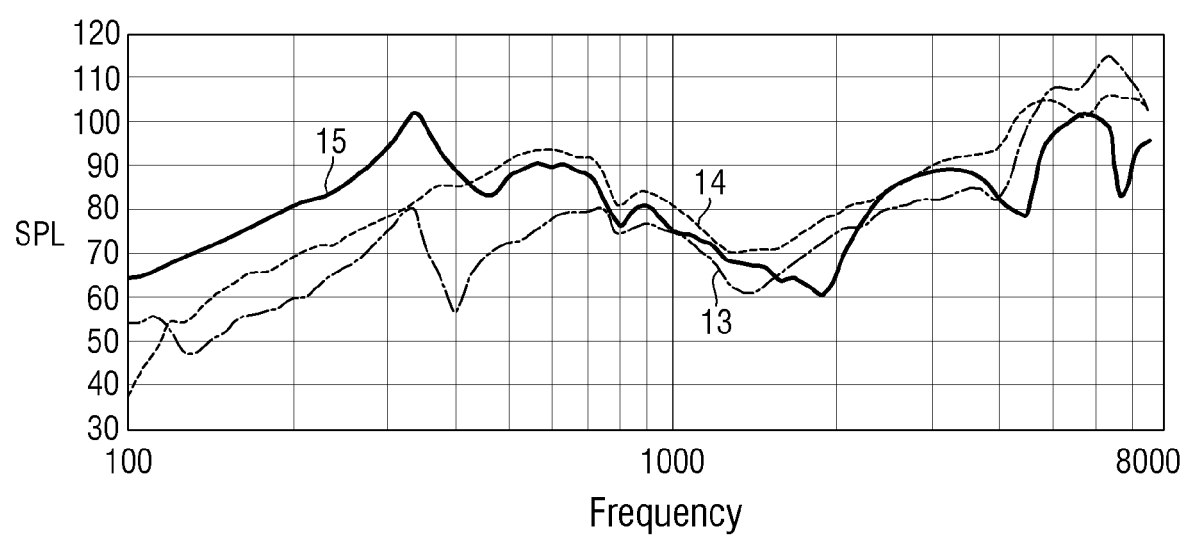
FIG. 13 is a graphical depiction illustrating sound pressure levels with respect to frequencies of the exemplary display devices of FIGS. 10 through 12.

FIG. 10 is a bottom view of a further exemplary embodiment of the display device of FIG. 2. FIG. 11 is a bottom view of still further exemplary embodiment of the display device of FIG. 2. FIG. 12 is a bottom view of yet another exemplary embodiment of the display device of FIG. 2. FIG. 13 is a graphical depiction illustrating sound pressure levels with respect to frequencies of the exemplary display devices of FIGS. 10 through 12. The respective display devices 13 through 15 of FIGS. 10 through 12 include sound generators 510 of the same size at different positions. A description of the same elements as those described above will be given briefly or omitted to avoid redundancy.

In FIG. 10, the display device 13 may include a sound generator 510 having a long axis in the first direction (X-axis direction) and a display panel 1300 having a long axis in the second direction (Y-axis direction) generally perpendicular to the first direction (X-axis direction).

The display panel 1300 may include first through fourth side surfaces 1301 through 1304 generally perpendicular or generally parallel to each other. The sound generator 510 may include first through fourth side surfaces 511 through 514 corresponding to the first through fourth side surfaces 1301 through 1304 of the display panel 1300, respectively.

Respective distances between the first, third and fourth side surfaces 511, 513 and 514 of the sound generator 510 and the first, third and fourth side surfaces 1301, 1303 and 1304 of the display panel 1300 may be substantially equal. The second side surface 512 of the sound generator 510 may face at least one of a display circuit board 1310, a sound driver 1330, and a flexible film 1390. For example, a first distance d1 between the first side surface 511 of the sound generator 510 and the first side surface 1301 of the display panel 1300 may be substantially equal to a third distance d3 between the third side surface 513 of the sound generator 510 and the third side surface 1303 of the display panel 1300 (d1=d3). The third distance d3 between the third side surface 513 of the sound generator 510 and the third side surface 1303 of the display panel 1300 may be substantially equal to a fourth distance d4 between the fourth side surface 514 of the sound generator 510 and the fourth side surface 1304 of the display panel 1300 (d3=d4). Therefore, the first, third and fourth distances d1, d3 and d4 may be substantially equal to each other.

Because the first, third and fourth distances d1, d3 and d4 are substantially equal, vibrations respectively generated from the first, third and fourth side surfaces 511, 513 and 514 of the sound generator 510 may respectively reach the first, third and fourth side surfaces 1301, 1303 and 1304 of the display panel 1300 at substantially the same time. In this case, the vibrations respectively reaching the first, third and fourth side surfaces 1301, 1303 and 1304 of the display panel 1300 may have substantially the same amplitude and phase. In addition, the vibrations returning to the sound generator 510 after reaching the first, third and fourth side surfaces 1301, 1303 and 1304 of the display panel 1300 may respectively reach the first, third and fourth side surfaces 511, 513 and 514 of the sound generator 510 at substantially the same time. Even in this case, the vibrations respectively reaching the first, third and fourth side surfaces 511, 513 and 514 of the sound generator 510 may have substantially the same amplitude and phase.

A second distance d2 between the second side surface 512 of the sound generator 510 and the second side surface 1302 of the display panel 1300 may be greater than the first distance d1 between the first side surface 511 of the sound generator 510 and the first side surface 1301 of the display panel 1300.

In FIG. 11, the display device 14 may include a sound generator 510 having a long axis in the first direction (X-axis direction) and a display panel 1300 having a long axis in the second direction (Y-axis direction) generally perpendicular to the first direction (X-axis direction).

The display panel 1300 may include first through fourth side surfaces 1301 through 1304 generally perpendicular or generally parallel to each other. The sound generator 510 may include first through fourth side surfaces 511 through 514 corresponding to the first through fourth side surfaces 1301 through 1304 of the display panel 1300, respectively.

Respective distances between the third and fourth side surfaces 513 and 514 of the sound generator 510 and the third and fourth side surfaces 1303 and 1304 of the display panel 1300 may be substantially equal. The second side surface 512 of the sound generator 510 may face at least one of a display circuit board 1310, a sound driver 1330, and a flexible film 1390. For example, a third distance d3 between the third side surface 513 of the sound generator 510 and the third side surface 1303 of the display panel 1300 may be substantially equal to a fourth distance d4 between the fourth side surface 514 of the sound generator 510 and the fourth side surface 1304 of the display panel 1300 (d3=d4).

A second distance d2 between the second side surface 512 of the sound generator 510 and the second side surface 1302 of the display panel 1300 may be greater than the first distance d1 between the first side surface 511 of the sound generator 510 and the first side surface 1301 of the display panel 1300.

For example, the second distance d2 in the display device 14 of FIG. 11 may be smaller than the second distance d2 in the display device 13 of FIG. 10. The difference between the second distance d2 and the first distance d1 in the display device 14 of FIG. 11 may be smaller than the difference between the second distance d2 and the first distance d1 in the display device 13 of FIG. 10. Therefore, the sound generator 510 of the display device 14 of FIG. 11 may be disposed closer to a center of the display panel 1300 than the sound generator 510 of the display device 13 of FIG. 10. Therefore, the display device 14 of FIG. 11 may use the display panel 1300 as a diaphragm more efficiently than the display device 13 of FIG. 10.

In FIG. 12, the display device 15 may include a sound generator 510 having a long axis in the second direction (Y-axis direction) and a display panel 1300 having a long axis in the second direction (Y-axis direction).

The display panel 1300 may include first through fourth side surfaces 1301 through 1304 generally perpendicular or generally parallel to each other. The sound generator 510 may include first through fourth side surfaces 511 through 514 corresponding to the first through fourth side surfaces 1301 through 1304 of the display panel 1300, respectively.

A first distance d1 between the first side surface 511 of the sound generator 510 and the first side surface 1301 of the display panel 1300 may be substantially equal to a second distance d2 between the second side surface 512 of the sound generator 510 and the second side surface 1302 of the display panel 1300 (d1=d2). A third distance d3 between the third side surface 513 of the sound generator 510 and the third side surface 1303 of the display panel 1300 may be substantially equal to a fourth distance d4 between the fourth side surface 514 of the sound generator 510 and the fourth side surface 1304 of the display panel 1300 (d3=d4). In addition, the first and second distances d1 and d2 may be different from the third and fourth distances d3 and d4, respectively. For example, the first and second distances d1 and d2 may be greater than the third and fourth distances d3 and d4, respectively, but the exemplary embodiments are not necessarily limited thereto.

Referring to FIG. 13 in connection with FIGS. 10 through 12, a sound pressure level SPL of the display device 15 of FIG. 12 in a low frequency band may be higher than sound pressure levels SPL of the display device 13 of FIG. 10 and the display device 14 of FIG. 11 in the low frequency band. For example, in a frequency band of about 400 Hz or less, the sound pressure level SPL of the display device 15 of FIG. 12 may be higher than the sound pressure level SPL of each of the display devices 13 and 14 of FIGS. 10 and 11.

The ratio of lengths of the first side surface 511 and the third side surface 513 of the sound generator 510 of the display device 15 illustrated in FIG. 12 may be closer to the ratio of lengths of the first side surface 1301 and the third side surface 1303 of the display panel 1300 than the ratio of lengths of the first side surface 511 and the third side surface 513 of each of the display devices 13 and 14 illustrated in FIGS. 10 and 11. Therefore, the display device 15 illustrated in FIG. 12 can improve a bass reproduction band and enhance the sound pressure level by minimizing distortion of sound.

Figure 14:
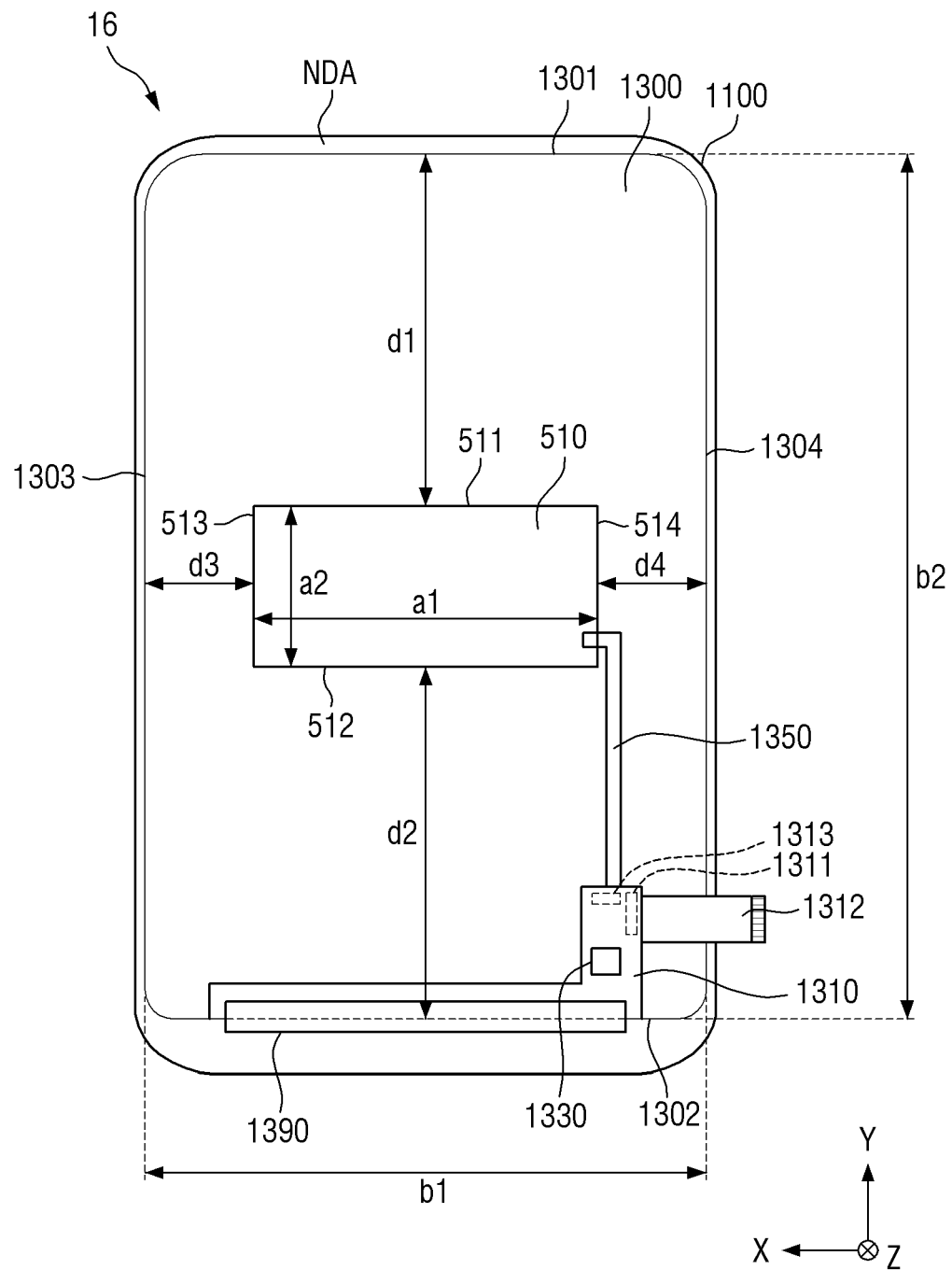
FIG. 14 is a bottom view of yet a further exemplary embodiment of the display device of FIG. 2.
Figure 15:
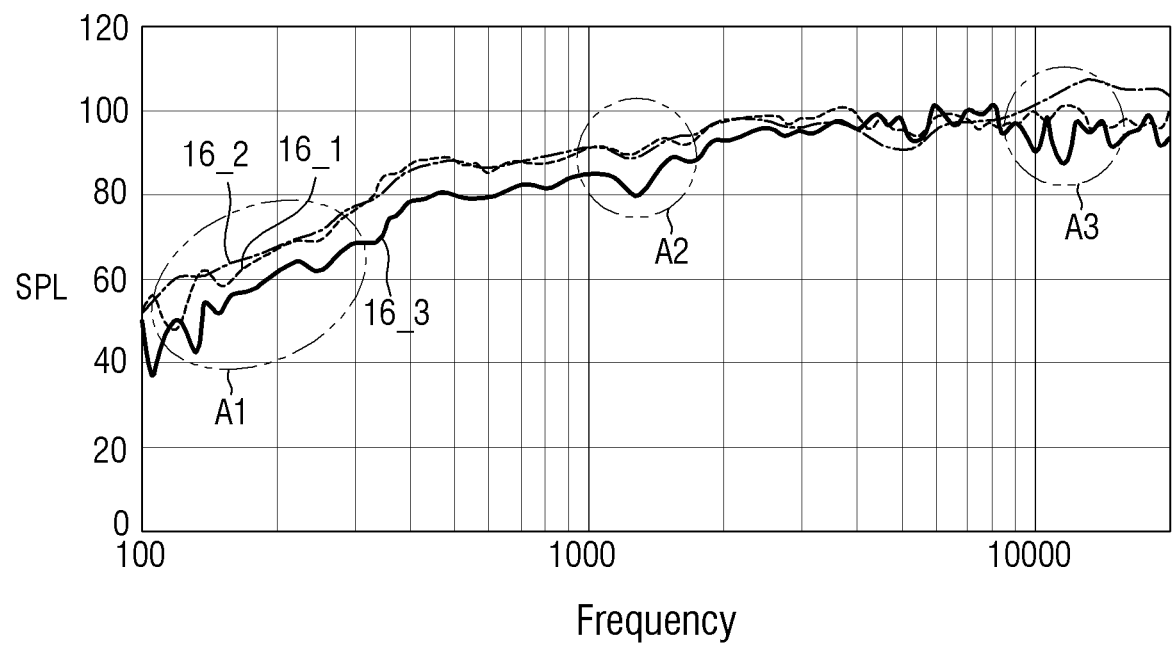
FIG. 15 is a graphical depiction illustrating sound pressure level with respect to frequency when the size of the sound generator of the exemplary display device of FIG. 14 is changed.
Figure 16:
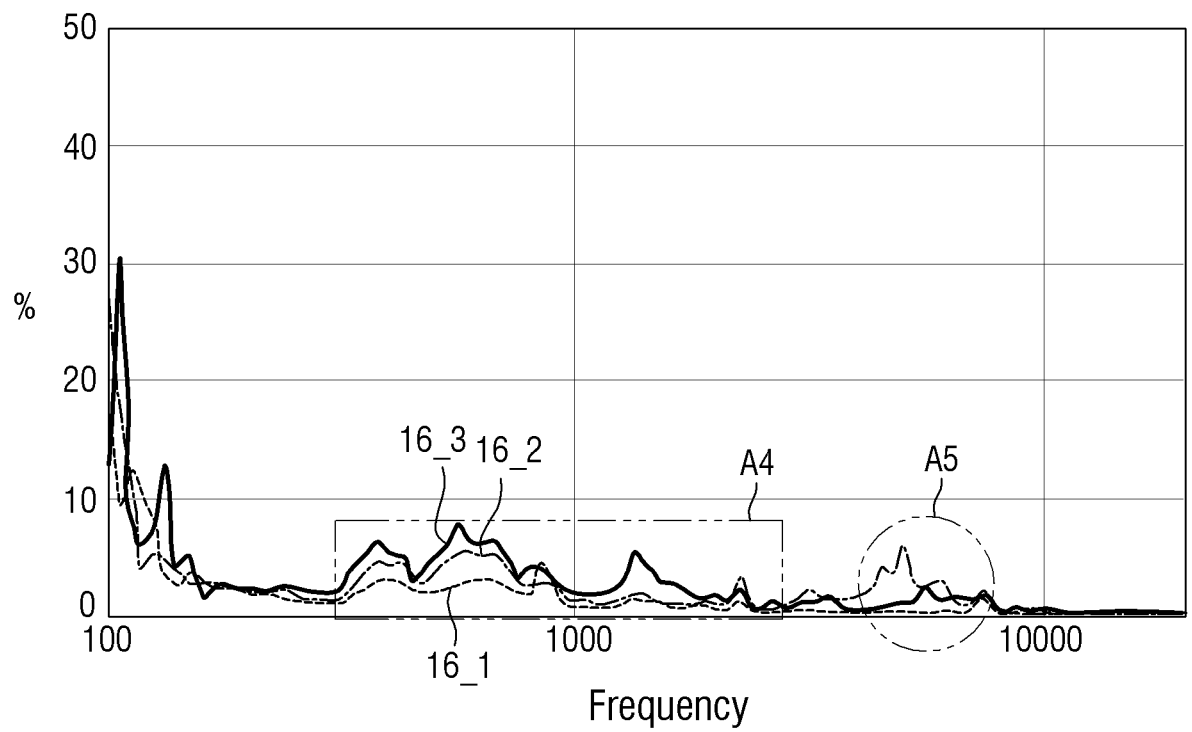
FIG. 16 is a graphical depiction illustrating total harmonic distortion (THD) with respect to frequency when the size of the sound generator of the exemplary display device of FIG. 14 is changed.

FIG. 14 is a bottom view of yet a further exemplary embodiment of the display device of FIG. 2. FIG. 15 is a graphical depiction illustrating sound pressure level with respect to frequency when the size of the sound generator of the exemplary display device of FIG. 14 is changed. FIG. 16 is a graphical depiction illustrating total harmonic distortion (THD) with respect to frequency when the size of the sound generator of the exemplary display device of FIG. 14 is changed.

Referring to FIGS. 14 through 16, the display device 16 may include first through third display devices 16_1 through 16_3 including sound generators 510 having different shapes and sizes. Certain components in these embodiments are not described or omitted to avoid redundancy with the discussion of embodiments having similar components.

The size of the sound generator 510, the size of a display panel 1300, and the ratio of a first distance d1 to a third distance d3 in each of the first through third display devices 16_1 through 16_3 are as shown in Table 1 below.

TABLE 1

| Display panel 1300 | | | Sound generator 510 of first display device 16_1 | Sound generator 510 of second display device 16_2 | Sound generator 510 of third display device 16_3 |
|---|---|---|---|---|---|
| b1(mm) | 73(b1) | a1(mm) | 25 | 15 | 10 |
| b2(mm) | 156(b2) | a2(mm) | 20 | 35 | 30 |
|  | — | d1(mm) | 68 | 70 | 73 |
|  | — | d3(mm) | 24 | 21 | 21 |
| b2/b1 | 2.14 | d1/d3 | 2.83 | 3.33 | 3.47 |

Referring to FIG. 15 in connection with FIG. 14, the sound pressure level SPL of the sound generator 510 of the third display device 16_3 may drop sharply in first through third areas A1 through A3. The respective sound generators 510 of the first and second display devices 16_1 and 16_2 may have similar sound pressure levels SPL.

Referring to FIG. 16 in connection with FIG. 14, the THD of the sound generator 510 of the third display device 16_3 may drop sharply in a fourth area A4. The THD of the sound generator 510 of the second display device 16_2 may drop sharply in a fifth area A5.

The ratio (d1/d3) of the first distance d1 and the third distance d3 of the first display device 16_1 may be closest to a ratio (b2/b1) of a short side and a long side of the display panel 1300. Therefore, the first display device 161 may output better sound than the second and third display devices 16_2 and 16_3

FIG. 17 is an exploded perspective view of an exemplary embodiment of a display device constructed according to principles of the invention.

Referring to FIG. 17, the display device 20 includes an upper set cover 2110, a lower set cover 2120, a display panel 2300, flexible films 2321, display driving circuits 2322, display circuit boards 2340, cables 2350, a control circuit board 2360, a timing control circuit 2371, a sound driver 2372, and a sound generator 510.

The upper set cover 2110 may cover edges of an upper surface of the display device 20. The upper set cover 2110 may cover a non-display area excluding a display area of the display panel 2300. The lower set cover 2120 may be disposed under the display panel 2300 and the sound generator 510. The lower set cover 2120 may be disposed to cover the display circuit boards 2340, the cables 2350 and the control circuit board 2360 when the flexible films 2321 are bent such that the display circuit boards 2340, the cables 2350, and the control circuit board 2360 are disposed under the display panel 2300.

The display panel 2300 may include a first substrate 2301 and a second substrate 2302. The second substrate 2302 may face a surface of the first substrate 2301. The first substrate 2301 and the second substrate 2302 may be generally rigid or flexible. The first substrate 2301 may be made of a glass or a plastic. The second substrate 2302 may be made of a glass, a plastic, an encapsulation film, or a barrier film. Alternatively, the second substrate 2302 may be omitted.

The display panel 2300 may be an organic light emitting display panel using an organic light emitting diode including a first electrode, an organic light emitting layer and a second electrode, an inorganic light emitting display panel using an inorganic light emitting diode including a first electrode, an inorganic semiconductor layer and a second electrode, or a quantum dot light emitting display panel including a quantum dot light emitting diode including a first electrode, a quantum dot light emitting layer and a second electrode.

A side of each of the flexible films 2321 may be disposed on the surface of the first substrate 2301 of the display panel 2300, and the other side may be attached onto a surface of one of the display circuit boards 2340. For example, because the first substrate 2301 is larger in size than the second substrate 2302, a side of the first substrate 2301 may be exposed without being covered by the second substrate 2302. The flexible films 2321 may be attached to the exposed side of the first substrate 2301 which is not covered by the second substrate 2302. Each of the flexible films 2321 may be attached onto the surface of the first substrate 2301 and the surface of one of the display circuit boards 2340 by using an anisotropic conductive film.

Each of the flexible films 2321 may be a flexible film such as a tape carrier package or a chip on film. The flexible films 2321 may be bent toward a lower surface of the first substrate 2301. In this case, the display circuit boards 2340, the cables 2350, and the control circuit board 2360 may be disposed on the lower surface of the first substrate 2301.

The display driving circuits 2322 may be disposed on surfaces of the flexible films 2321, respectively. The display driving circuits 2322 may be formed as integrated circuits. Each of the display driving circuits 2322 may convert digital video data into analog data voltages according to a data control signal of the timing control circuit 2371 and supply the analog data voltages to data lines of the display panel 2300 through the flexible films 2321.

The display panel 2300 may include scan lines intersecting the data lines and pixels disposed in areas defined by the data lines and the scan lines. The scan lines may receive scan signals from a scan driver formed in the display panel 2300. The scan driver may include a plurality of thin-film transistors to generate scan signals according to a scan control signal of the timing control circuit 2371. Each of the pixels is connected to at least one data line and at least one scan line and receives a data voltage of the data line when a scan signal is supplied to the scan line.

Each of the display circuit boards 2340 may be connected to the control circuit board 2360 through the cables 2350. Each of the display circuit boards 2340 may include connectors 2351 for connection to the cables 2350. The display circuit boards 2340 may be flexible printed circuit boards or printed circuit boards. The cables 2350 may be flexible cables.

The control circuit board 2360 may be connected to the display circuit boards 2340 through the cables 2350. To this end, the control circuit board 2360 may include connectors 2351 for connection to the cables 2350. The control circuit board 2360 may be a flexible printed circuit board or a printed circuit board.

The timing control circuit 2371 may be disposed on a surface of the control circuit board 2360. The timing control circuit 2371 may be formed as an integrated circuit. The timing control circuit 2371 may receive digital video data and timing signals from a system on chip of a system circuit board and generate a data control signal for controlling the timings of the display driving circuits 2322 according to the timing signals.

The sound driver 2372 may be disposed on the surface of the control circuit board 2360. The sound driver 2372 may be formed as an integrated circuit. The sound driver 2372 may receive sound data from the system circuit board. The sound driver 2372 may convert sound data, which is digital data, into a sound signal which is an analog signal. The sound driver 2372 may output the sound signal to the sound generator 510.

The sound generator 510 may be disposed on the other surface opposite the surface of the first substrate 2301. The sound generator 510 may vibrate the display panel 2300 in the third direction (Z-axis direction) according to the sound signal of the sound driver 2372. The sound generator 510 may be a piezoelectric element or a piezoelectric actuator that vibrates the display panel 2300 by using a piezoelectric material that contracts or expands according to an applied voltage.

Figure 18:
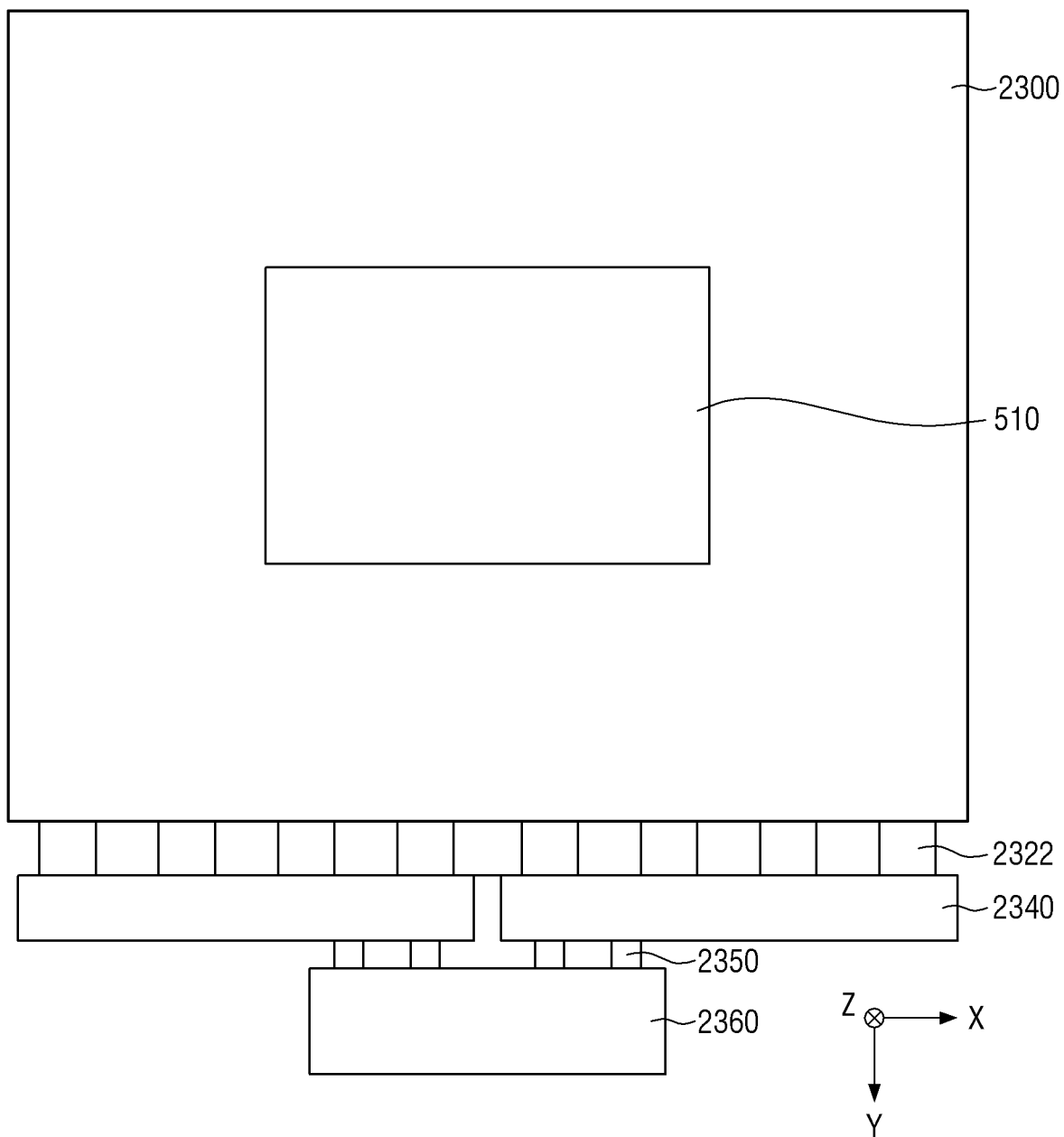
FIG. 18 is a bottom view of the display device when the flexible films of FIG. 17 are unfolded.
Figure 20:
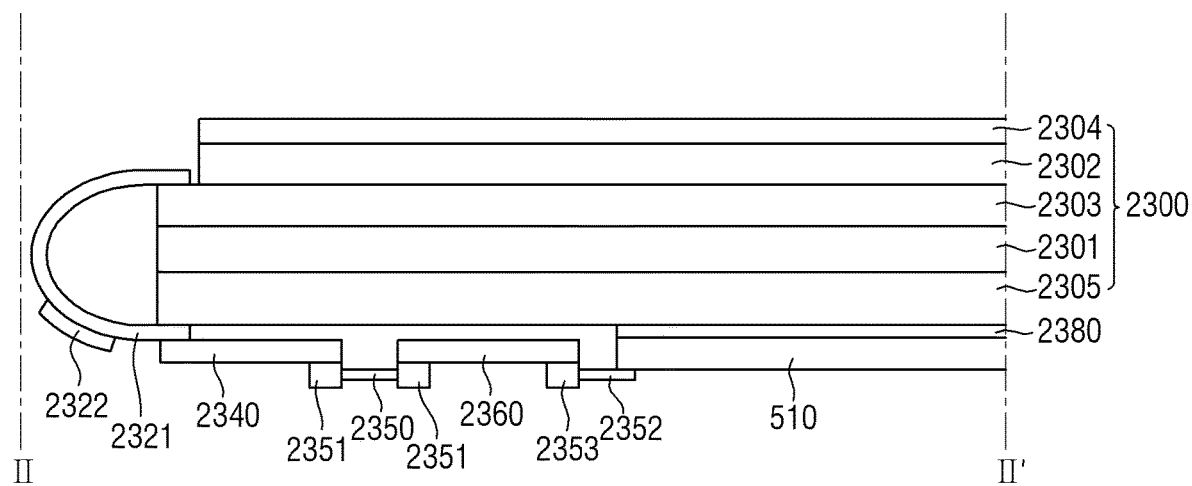

FIG. 18 is a bottom view of the display device when the flexible films of FIG. 17 are unfolded. FIG. 19 is a bottom view of the display device of FIG. 17. FIG. 20 is a cross-sectional view taken along line II-II' of FIG. 19.

Referring to FIGS. 18 through 20, a sound generator 510 may be disposed on a lower surface of a display panel 2300 and electrically connected to a sound driver 2372 disposed on a control circuit board 2360 through a flexible circuit board 2352. The sound generator 510 may be attached to the lower surface of the display panel 2300 through an adhesive member 2380 such as a pressure sensitive adhesive. Therefore, the sound generator 510 may vibrate the display panel 2300 by vibrating in the thickness direction (Z-axis direction) of the display panel 2300.

The display panel 2300 may include a plurality of side surfaces. For example, the display panel 2300 may include first through fourth side surfaces generally perpendicular or generally parallel to each other. The first side surface of the display panel 2300 may be an upper side surface of the display panel 2300 in plan view, and the second side surface may be a lower side surface corresponding to the first side surface. The third side surface of the display panel 2300 may be a left side surface of the display panel 2300 in plan view, and the fourth side surface may be a right side surface corresponding to the third side surface. The first and second side surfaces may be generally perpendicular to the third and fourth side surfaces, respectively.

The sound generator 510 may include a plurality of side surfaces corresponding to the side surfaces of the display panel 2300, respectively. Therefore, the shape of the sound generator 510 may be determined by the shape of the display panel 2300. For example, the sound generator 510 may include first through fourth side surfaces 511 through 514 corresponding to the first through fourth side surfaces of the display panel 2300, respectively.

Respective distances between the side surfaces of the sound generator 510 and the side surfaces of the display panel 2300 respectively corresponding to the side surfaces of the sound generator 510 may be substantially equal. The respective distances between the first through fourth side surfaces 511 through 514 of the sound generator 510 and the first through fourth side surfaces of the display panel 2300 may be substantially equal. For example, a first distance d1 between the first side surface 511 of the sound generator 510 and the first side surface of the display panel 2300 may be substantially equal to a second distance d2 between the second side surface 512 of the sound generator 510 and the second side surface of the display panel 2300 (d1=d2). A third distance d3 between the third side surface 513 of the sound generator 510 and the third side surface of the display panel 2300 may be substantially equal to a fourth distance d4 between the fourth side surface 514 of the sound generator 510 and the fourth side surface of the display panel 2300 (d3=d4). In addition, the first and second distances d1 and d2 may be substantially equal to the third and fourth distances d3 and d4, respectively (d1=d2=d3=d4).

Because the first through fourth distances d1 through d4 are substantially equal, vibrations respectively generated from the first through fourth side surfaces 511 through 514 of the sound generator 510 may respectively reach the first through fourth side surfaces of the display panel 2300 at substantially the same time. In this case, the vibrations respectively reaching the first through fourth side surfaces of the display panel 2300 may have substantially the same amplitude and phase. In addition, the vibrations returning to the sound generator 510 after reaching the first through fourth side surfaces of the display panel 2300 may respectively reach the first through fourth side surfaces 511 through 514 of the sound generator 510 at substantially the same time. Even in this case, the vibrations respectively reaching the first through fourth side surfaces 511 through 514 of the sound generator 510 may have substantially the same amplitude and phase.

Therefore, a display device 20 including the sound generator 510 and the display panel 2300 disposed according to the first through fourth distances d1 through d4 can improve the sound pressure level of a sound output from the display panel 2300. The display device 20 optimizes constructive interference and destructive interference between a plurality of vibrations of the display panel 2300, thereby minimizing distortion of sound to improve a bass reproduction band and enhance the sound pressure level.

For example, a ratio of a length of the first side surface 511 of the sound generator 510 to a length of the third side surface 513 generally perpendicular to the first side surface 511 may be substantially equal to a ratio of a length of the first side surface of the display panel 2300 corresponding to the first side surface 511 of the sound generator 510 to a length of the third side surface generally perpendicular to the first side surface of the display panel 2300. Because the shape of the sound generator 510 is substantially the same as the shape of the display panel 2300, the distances between the first through fourth side surfaces 511 through 514 of the sound generator 510 and the first through fourth side surfaces of the display panel 2300 may all be substantially equal. Therefore, because the distances from all the side surfaces of the sound generator 510 to the display panel 2300 are substantially equal, THD can be minimized, and the sound pressure level of the display device 20 can be improved.

Flexible films 2321 may be bent toward the lower surface of the display panel 2300 and attached to display circuit boards 2340. The display circuit boards 2340 and the control circuit board 2360 may be disposed on a surface of the display panel 2300 and connected to each other through cables 2350.

The sound generator 510 may be attached to the lower surface of the display panel 2300 by an adhesive member such as a pressure sensitive adhesive. The sound generator 510 may be electrically connected to the control circuit board 2360 through the flexible circuit board 2352. The flexible circuit board 2352 may be a flexible printed circuit board or a flexible cable.

A side of the flexible circuit board 2352 may include a first pad and a second pad. The first pad of the flexible circuit board 2352 may be connected to a first electrode of the sound generator 510, and the second pad of the flexible circuit board 2352 may be connected to a second electrode of the sound generator 510.

A connection part for connection to a connector 2353 of the control circuit board 2360 may be formed on the other side of the flexible circuit board 2352. The sound generator 510 may be connected to the connector 2353 of the control circuit board 2360 by the connection part of the flexible circuit board 2352.

A timing control circuit 2371 and the sound driver 2372 may be disposed on the control circuit board 2360. Alternatively, the sound driver 2372 may be disposed on a system circuit board, a power circuit board, or a sound circuit board other than the control circuit board 2360. On the sound circuit board, only the sound driver 2372 can be mounted without other integrated circuits.

The sound driver 2372 may include a digital signal processor (DSP) for digitally processing sound signals, a digital-to-analog converter (DAC) for converting digital signals output from the DSP into driving voltages which are analog signals, and an amplifier (AMP) for amplifying the analog driving voltages output from the DAC and outputting the amplified analog driving voltages.

The sound driver 2372 may generate a sound signal including a first driving voltage and a second driving voltage for driving the sound generator 510 according to stereo signals. The sound generator 510 may receive the sound signal including the first driving voltage and the second driving voltage from the sound driver 2372. The sound generator 510 may output sound by vibrating the display panel 2300 according to the first driving voltage and the second driving voltage.

The display panel 2300 may include a first substrate 2301, a second substrate 2302, a pixel array layer 2303, a cover window 2304, and a heat dissipating film 2305. The second substrate 2302 may face a surface of the first substrate 2301. The pixel array layer 2303 may be disposed between the first substrate 2301 and the second substrate 2302. A description of the pixel array layer 2303 will be omitted to avoid redundancy because it can be found in the description of FIG. 5. The cover window 2304 may be disposed on the second substrate 2302 to protect an upper surface of the display panel 2300.

The heat dissipating film 2305 may be disposed on a lower surface of the first substrate 2301. The sound generator 510 may be disposed on a lower surface of the heat dissipating film 2305 to dissipate heat generated by the sound generator 510. For example, the heat dissipating film 2305 may include a metal layer having high thermal conductivity, such as graphite, silver (Ag), copper (Cu) or aluminum (Al).

FIG. 21 is a bottom view of another exemplary embodiment of the display device of FIG. 17. Referring to FIG. 21, a display device 21 may include a plurality of sound generators, each including one or more side surfaces respectively corresponding to a plurality of side surfaces of a display panel 2300. For example, the sound generators may include first and second sound generators 520 and 530. The first and second sound generators 520 and 530 may be spaced apart from each other in a direction generally parallel to first and second side surfaces of the display panel 2300. Therefore, the first and second sound generators 520 and 530 may be spaced apart from each other in the first direction (X-axis direction).

The first and second sound generators 520 and 530 may be disposed on a lower surface of the display panel 2300. The first and second sound generators 520 and 530 may be electrically connected to a sound driver 2372 on a control circuit board 2360 through flexible circuit boards 2352, respectively. The first and second sound generators 520 and 530 may be attached to the lower surface of the display panel 2300 through an adhesive member such as a pressure sensitive adhesive. Therefore, the first and second sound generators 520 and 530 may vibrate the display panel 2300 by vibrating in the thickness direction (Z-axis direction) of the display panel 2300.

The display panel 2300 may include a plurality of side surfaces. For example, the display panel 2300 may include first through fourth side surfaces generally perpendicular or generally parallel to each other. The first side surface of the display panel 2300 may be an upper side surface of the display panel 2300 in plan view, and the second side surface may be a lower side surface corresponding to the first side surface. The third side surface of the display panel 2300 may be a left side surface of the display panel 2300 in plan view, and the fourth side surface may be a right side surface corresponding to the third side surface. The first and second side surfaces may be generally perpendicular to the third and fourth side surfaces, respectively.

Each of the first and second sound generators 520 and 530 may include one or more side surfaces corresponding to the side surfaces of the display panel 2300, respectively. For example, the first sound generator 520 may include first through fourth side surfaces 521 through 524, and the second sound generator 530 may include first through fourth side surfaces 531 through 534. The first through third side surfaces 521 through 523 of the first sound generator 520 may correspond to the first through third side surfaces of the display panel 2300, respectively. The first, second and fourth side surfaces 531, 532 and 534 of the second sound generator 530 may correspond to the first, second and fourth side surfaces of the display panel 2300, respectively.

Respective distances between the side surfaces of the display panel 2300 and the side surfaces of each of the first and second sound generators 520 and 530 respectively corresponding to the side surfaces of the display panel 2300 may be substantially equal. For example, a first distance d1 between the first side surface 521 or 531 of the first or second sound generator 520 or 530 and the first side surface of the display panel 2300 may be substantially equal to a second distance d2 between the second side surface 522 or 532 of the first or second sound generator 520 or 530 and the second side surface of the display panel 2300 (d1=d2). A third distance d3 between the third side surface 523 of the first sound generator 520 and the third side surface of the display panel 2300 may be substantially equal to a fourth distance d4 between the fourth side surface 534 of the second sound generator 530 and the fourth side surface of the display panel 2300 (d3=d4). In addition, the first and second distances d1 and d2 may be substantially equal to the third and fourth distances d3 and d4, respectively (d1=d2=d3=d4).

Because the first through fourth distances d1 through d4 are substantially equal, vibrations respectively generated from the first through third side surfaces 521 through 523 of the first sound generator 520 and vibrations respectively generated from the first, second and fourth side surfaces 531, 532 and 534 of the second sound generator 530 may respectively reach the first through fourth side surfaces of the display panel 2300 at substantially the same time. In this case, the vibrations respectively reaching the first through fourth side surfaces of the display panel 2300 may have substantially the same amplitude and phase. In addition, the vibrations respectively returning to the first and second sound generators 520 and 530 after reaching the first through fourth side surfaces of the display panel 2300 may respectively reach the first and second sound generators 520 and 530 at substantially the same time. Even in this case, the vibrations respectively reaching the first and second sound generators 520 and 530 may have substantially the same amplitude and phase.

Therefore, the display device 21 including the first and second sound generators 520 and 530 and the display panel 2300 disposed according to the first through fourth distances d1 through d4 can improve the sound pressure level of a sound output from the display panel 2300. The display device 21 optimizes constructive interference and destructive interference between a plurality of vibrations of the display panel 2300, thereby minimizing distortion of sound to improve a bass reproduction band and enhance the sound pressure level.

For example, the display device 21 may include a sound generating area including the first and second sound generators 520 and 530 and a space between the first and second sound generators 520 and 530. The ratio of lengths of a first side surface and a third side surface of the sound generating area may be substantially equal to the ratio of lengths of the first side surface and the third side surface of the display panel 2300. Because the shape of the sound generating area is substantially the same as the shape of the display panel 2300, distances between a plurality of side surfaces of the sound generating area and the first through fourth side surfaces of the display panel 2300 may all be substantially equal. Therefore, because the distances from all the side surfaces of the sound generating area to the display panel 2300 are substantially equal, THD can be minimized, and the sound pressure level of the display device 21 can be improved.

Each of the first through fourth distances d1 through d4 may be smaller than a fifth distance d5 between the first and second sound generators 520 and 530. For example, the distance d5 between the first and second sound generators 520 and 530 may be greater than the first distance d1 between the first side surface 521 or 531 of the first or second sound generator 520 or 530 and the first side surface of the display panel 2300 (d5>d1). The fifth distance d5 between the first and second sound generators 520 and 530 may be greater than the second distance d2 between the second side surface 522 or 532 of the first or second sound generator 520 or 530 and the second side surface of the display panel 2300 (d5>d2). The fifth distance d5 between the first and second sound generators 520 and 530 may be greater than the third distance d3 between the third side surface 523 of the first sound generator 520 and the third side surface of the display panel 2300 (d5>d3). The fifth distance d5 between the first and second sound generators 520 and 530 may be greater than the fourth distance d4 between the fourth side surface 534 of the second sound generator 530 and the fourth side surface of the display panel 2300. Because the first and second sound generators 520 and 530 are spaced apart from each other by the distance greater than the distance from the display panel 2300, vibration interference between the first and second sound generators 520 and 530 can be minimized. Therefore, the display device 21 including the first and second sound generators 520 and 530 spaced apart from each other by the fifth distance d5 greater than the first through fourth distances d1 through d4 can minimize distortion of sound and improve the sound pressure level.

FIG. 22 is a bottom view of still another exemplary embodiment of the display device of FIG. 17. The display device 22 of FIG. 22 is different from the display device of FIG. 19 in the configuration of the sound generator 510. Thus, a description of the same elements as those described above will be given briefly or omitted to avoid redundancy.

Referring to FIG. 22, the display device 22 may include a plurality of sound generators, each including one or more side surfaces respectively corresponding to a plurality of side surfaces of a display panel 2300. For example, the sound generators may include first through fourth sound generators 540 through 570. The first through fourth sound generators 540 through 570 may correspond to first through fourth corners 2310-2313 of the display panel 2300, respectively. The first through fourth sound generators 540 through 570 may be spaced apart from each other in the first direction (X-axis direction) or the second direction (Y-axis direction).

The first through fourth sound generators 540 through 570 may be disposed on a lower surface of the display panel 2300. The first through fourth sound generators 540 through 570 may be electrically connected to a sound driver 2372 on a control circuit board 2360 through flexible circuit boards 2352, respectively. The first through fourth sound generators 540 through 570 may be attached to the lower surface of the display panel 2300 through an adhesive member such as a pressure sensitive adhesive. Therefore, the first through fourth sound generators 540 through 570 may vibrate the display panel 2300 by vibrating in the thickness direction (Z-axis direction) of the display panel 2300.

The display panel 2300 may include a plurality of side surfaces. For example, the display panel 2300 may include first through fourth side surfaces generally perpendicular or generally parallel to each other. The first side surface of the display panel 2300 may be an upper side surface of the display panel 2300 in plan view, and the second side surface may be a lower side surface corresponding to the first side surface. The third side surface of the display panel 2300 may be a left side surface of the display panel 2300 in plan view, and the fourth side surface may be a right side surface corresponding to the third side surface. The first and second side surfaces may be generally perpendicular to the third and fourth side surfaces, respectively.

Each of the first through fourth sound generators 540 through 570 may include one or more side surfaces corresponding to the side surfaces of the display panel 2300, respectively. For example, a first side surface of each of the first and second sound generators 540 and 550 may correspond to the first side surface of the display panel 2300. A second side surface of each of the third and fourth sound generators 560 and 570 may correspond to the second side surface of the display panel 2300. A third side surface of each of the first and third sound generators 540 and 560 may correspond to the third side surface of the display panel 2300. A fourth side surface of each of the second and fourth sound generators 550 and 570 may correspond to the fourth side surface of the display panel 2300.

Respective distances between the side surfaces of the display panel 2300 and the side surfaces of each of the first through fourth sound generators 540 through 570 respectively corresponding to the side surfaces of the display panel 2300 may be substantially equal. For example, a first distance d1 between the first side surface of the first or second sound generator 540 or 550 and the first side surface of the display panel 2300 may be substantially equal to a second distance d2 between the second side surface of the third or fourth sound generator 560 or 570 and the second side surface of the display panel 2300 (d1=d2). A third distance d3 between the third side surface of the first or third sound generator 540 or 560 and the third side surface of the display panel 2300 may be substantially equal to a fourth distance d4 between the fourth side surface of the second or fourth sound generator 550 or 570 and the fourth side surface of the display panel 2300 (d3=d4). In addition, the first and second distances d1 and d2 may be substantially equal to the third and fourth distances d3 and d4, respectively (d1=d2=d3=d4).

Because the first through fourth distances d1 through d4 are substantially equal, vibrations generated from the first through fourth sound generators 540 through 570 may respectively reach the first through fourth side surfaces of the display panel 2300 at substantially the same time. In this case, the vibrations respectively reaching the first through fourth side surfaces of the display panel 2300 may have substantially the same amplitude and phase. In addition, the vibrations returning to the first through fourth sound generators 540 through 570 after reaching the first through fourth side surfaces of the display panel 2300 may reach the first through fourth sound generators 540 through 570 at substantially the same time. Even in this case, the vibrations reaching the first through fourth sound generators 540 through 570 may have substantially the same amplitude and phase.

Therefore, the display device 22 including the first through fourth sound generators 540 through 570 and the display panel 2300 disposed according to the first through fourth distances d1 through d4 can improve the sound pressure level of a sound output from the display panel 2300. The display device 22 optimizes constructive interference and destructive interference between a plurality of vibrations of the display panel 2300, thereby minimizing distortion of sound to improve a bass reproduction band and enhance the sound pressure level.

For example, the display device 22 may include a sound generating area including the first through fourth sound generators 540 through 570 and a space between the first through fourth sound generators 540 through 570. The ratio of lengths of a first side surface and a third side surface of the sound generating area may be substantially equal to the ratio of lengths of the first side surface and the third side surface of the display panel 2300. Because the shape of the sound generating area is substantially the same as the shape of the display panel 2300, distances between a plurality of side surfaces of the sound generating area and the first through fourth side surfaces of the display panel 2300 may all be substantially equal. Therefore, because the distances from all the side surfaces of the sound generating area to the display panel 2300 are substantially equal, THD can be minimized, and the sound pressure level of the display device 22 can be improved.

FIG. 23 is a bottom view of a further exemplary embodiment of the display device of FIG. 17. The display device 23 of FIG. 23 is different from the display device of FIG. 19 in the configuration of the sound generator 510. Thus, a description of the same elements as those described above will be given briefly or omitted to avoid redundancy.

Referring to FIG. 23, the display device 23 may include a first sound generator 580 having a plurality of side surfaces and a second sound generator 590 surrounding the first sound generator 580 and having a plurality of side surfaces corresponding to a plurality of side surfaces of a display panel 2300, respectively.

The second sound generator 590 may include first through fourth side surfaces 591 through 594 corresponding to first through fourth side surfaces of the display panel 2300, respectively. Respective distances between the side surfaces of the second sound generator 590 and the side surfaces of the display panel 2300 respectively corresponding to the side surfaces of the second sound generator 590 may be substantially equal. The respective distances between the first through fourth side surfaces 591 through 594 of the second sound generator 590 and the first through fourth side surfaces of the display panel 2300 may be substantially equal. For example, a first distance d1 between the first side surface 591 of the second sound generator 590 and the first side surface of the display panel 2300 may be substantially equal to a second distance d2 between the second side surface 592 of the second sound generator 590 and the second side surface of the display panel 2300 (d1=d2). A third distance d3 between the third side surface 593 of the second sound generator 590 and the third side surface of the display panel 2300 may be substantially equal to a fourth distance d4 between the fourth side surface 594 of the second sound generator 590 and the fourth side surface of the display panel 2300 (d3=d4). In addition, the first and second distances d1 and d2 may be substantially equal to the third and fourth distances d3 and d4, respectively (d1=d2=d3=d4).

Because the first through fourth distances d1 through d4 are substantially equal, vibrations respectively generated from the first through fourth side surfaces 591 through 594 of the second sound generator 590 may respectively reach the first through fourth side surfaces of the display panel 2300 at substantially the same time. In this case, the vibrations respectively reaching the first through fourth side surfaces of the display panel 2300 may have substantially the same amplitude and phase. In addition, the vibrations returning to the second sound generator 590 after reaching the first through fourth side surfaces of the display panel 2300 may respectively reach the first through fourth side surfaces 591 through 594 of the second sound generator 590 at substantially the same time. Even in this case, the vibrations respectively reaching the first through fourth side surfaces 591 through 594 of the second sound generator 590 may have substantially the same amplitude and phase.

Therefore, the display device 23 including the second sound generator 590 and the display panel 2300 disposed according to the first through fourth distances d1 through d4 can improve the sound pressure level of a sound output from the display panel 2300. The display device 23 optimizes constructive interference and destructive interference between a plurality of vibrations of the display panel 2300, thereby minimizing distortion of sound to improve a bass reproduction band and enhance the sound pressure level.

For example, the ratio of the length of the first side surface 591 of the second sound generator 590 to the length of the third side surface 593 generally perpendicular to the first side surface 591 may be substantially equal to the ratio of the length of the first side surface of the display panel 2300 corresponding to the first side surface 591 of the second sound generator 590 to the length of the third side surface generally perpendicular to the first side surface of the display panel 2300. Because the shape of the second sound generator 590 is substantially the same as the shape of the display panel 2300, distances between the first through fourth side surfaces 591 through 594 of the second sound generator 590 and the first through fourth side surfaces of the display panel 2300 may all be substantially equal. Therefore, because the distances from all the side surfaces of the second sound generator 590 to the display panel 2300 are substantially equal, THD can be minimized, and the sound pressure level of the display device 23 can be improved.

For example, the first sound generator 580 may have a generally closed loop shape in plan view. The second sound generator 590 may have a generally closed loop shape while surrounding the first sound generator 580 at the distance from the first sound generator 580. The width d6 of the first sound generator 580 in plan view may be substantially equal to the width d7 of the second sound generator 590 in plan view. The first and second sound generators 580 and 590 may be driven independently to complement each other's vibrations. Therefore, the display device 23 including the first and second sound generators 580 and 590 can minimize THD and improve the sound pressure level of the display device 23.

FIG. 24 is a plan view of yet another exemplary embodiment of a display device constructed according to principles of the invention. Referring to FIG. 24, the display device 30 includes a substrate 3110, a generally circular display part 3120, a driving circuit part 3130, a scan driver 3140, a driving power supply line 3150, and a cathode power supply line 3160.

The substrate 3110 may include a generally circular art part 3111 and a driving circuit connection part 3113. For example, the substrate 3110 may be a flexible substrate or a plastic substrate. The generally circular arc part 3111 may have a generally circular arc shape having substantially the same radius from the center of the generally circular display part 3120. The driving circuit connection part 3113 may extend from a side of the generally circular arc part 3111. The driving circuit connection part 3113 may include the driving circuit part 3130, a driving pad part 3114, and a plurality of link lines. The driving circuit connection part 3113 may be connected to a display driver through the driving pad part 3114.

The substrate 3110 may further include a touch circuit connection part 3115. The touch circuit connection part 3115 may extend from the other side of the generally circular art part 3111. The touch circuit connection part 3115 may be connected to a touch driver of the display device 30 through a touch pad part 3116.

The substrate 3110 may be disposed on a support substrate 3100. The support substrate 3100 may be formed in substantially the same shape as the substrate 3110 to maintain the substrate 3110 made of a generally, flat, flexible material. The support substrate 3100 may include a generally circular arc part 3101 surrounding the generally circular arc part 3111 of the substrate 3110.

The generally circular display part 3120 may be disposed in a generally circular shape on the generally circular art part 3111 of the substrate 3110. The generally circular display part 3120 may have a radius smaller than the radius of the generally circular arc part 3111 from the center. The generally circular display part 3120 may include a display area DA and a dummy pixel area DMA surrounding the display area DA. The display area DA may include a plurality of pixels that display an image. The dummy pixel area DMA may be disposed along a circumference of the display area DA to cover pixels formed in an outermost part of the display area DA. The dummy pixel area DMA may include a plurality of dummy pixels.

The driving circuit part 3130 may drive the pixels formed in the display area DA of the generally circular display part 3120 by using image data, control signals and driving voltages supplied from the display driver through the driving pad part 3114. Therefore, the display area DA of the generally circular display part 3120 may be driven by the driving circuit part 3130 to display an image.

The scan driver 3140 may be formed in a generally circular arc shape along a circumference of the generally circular display part 3120 and connected to a plurality of scan lines. The scan driver 3140 may generate scan pulses in response to a scan control signal supplied from the display driver through the driving pad part 3114 and scan control link lines. The scan driver 3140 may sequentially supply the scan pulses to the scan lines. For example, the scan driver 3140 may be formed along a left circumference or a right circumference of the generally circular display part 3120 and may supply the scan pulses to an end or the other end of each of the scan lines.

The driving power supply line 3150 may supply pixel driving power to a plurality of pixel power lines. The driving power supply line 3150 may supply the pixel driving power in a direction opposite to a direction in which data signals are supplied from the driving circuit part 3130 to data lines. The driving power supply line 3150 may be connected to respective lower ends of a plurality of pixel power lines based on a center of the display area DA through a plurality of driving power link lines, respectively.

The driving power supply line 3150 may be divided into a circumferential line 3151 and first and second shoulder lines 3153 and 3155 according to positions on the substrate 3110. The circumferential line 3151 may be formed along the circumference of the generally circular display part 3120 except for a side of the generally circular display part 3120 adjacent to the driving circuit connection part 3113. The first shoulder line 3153 may be formed with a generally constant curvature between an end of the circumferential line 3151 adjacent to the driving circuit connection part 3113 and a first driving power pad of the driving pad part 3114. The first shoulder line 3153 may connect the end of the circumferential line 3151 to the first driving power pad.

The second shoulder line 3155 may be formed with the generally constant curvature between the other end of the circumferential line 3151 adjacent to the driving circuit connection part 3113 and a second driving power pad of the driving pad part 3114. The second shoulder line 3155 may connect the other end of the circumferential line 3151 to the second driving power pad.

The cathode power supply line 3160 may be formed on the substrate 3110 between the driving power supply line 3150 and the generally circular display part 3120 along the circumference of the generally circular display part 3120 to have a constant width and thickness. Both ends of the cathode power supply line 3160 may be connected to a cathode power pad of the driving pad part 3114 formed in the driving circuit connection part 3113. For example, the cathode power supply line 3160 may be formed generally parallel to the driving power supply line 3150 while having the same structure as the driving power supply line 3150.

FIG. 25 is a bottom view of the yet another exemplary embodiment of the display device of FIG. 24.

Referring to FIG. 25, a sound generator 510 may be disposed on a lower surface of a support substrate 3100 to vibrate the support substrate 3100 and a substrate 3110. The support substrate 3100 and the substrate 3110 may function as a diaphragm. The sound generator 510 may be attached onto the lower surface of the support substrate 3100 by using an adhesive member such as a pressure sensitive adhesive. For example, the sound generator 510 may be a piezoelectric element or a piezoelectric actuator that vibrates the support substrate 3100 by using a piezoelectric material that contracts or expands according to an applied voltage. The sound generator 510 may be surrounded by a generally curved surface. For example, the sound generator 510 may have a generally circular shape corresponding to a generally circular arc part 3101 of the support substrate 3100 or a generally circular arc part 3111 of the substrate 3110.

The sound generator 510 and the support substrate 3100 may have substantially the same center point CP. The sound generator 510 may include a generally circular side surface having a first radius r1. The generally circular arc part 3101 of the support substrate 3100 may include a generally circular side surface having a second radius r2 greater than the first radius r1. A distance d1 between one point on the side surface of the sound generator 510 and the generally circular arc part 3101 of the support substrate 3100 may be substantially equal to a distance d1 between another point on the side surface of the sound generator 510 and the generally circular arc part 3101 of the support substrate 3100.

Because the distances between different parts of the side surface of the sound generator 510 and the generally circular arc part 3101 of the support substrate 3100 are substantially equal, vibrations generated from the sound generator 510 may reach the generally circular arc part 3101 of the support substrate 3100 at substantially the same time. In this case, the vibrations reaching the generally circular arc part 3101 of the support substrate 3100 may have substantially the same amplitude and phase. In addition, the vibrations returning to the sound generator 510 after reaching the generally circular arc part 3101 of the support substrate 3100 may reach the different parts of the side surface of the sound generator 510 at substantially the same time. Even in this case, the vibrations reaching the different parts of the side surface of the sound generator 510 may have substantially the same amplitude and phase.

Therefore, the display device 30 including the sound generator 510 and the generally circular arc part 3101 of the support substrate 3100 separated apart from each other by a substantially constant distance can improve the sound pressure level of a sound output from the support substrate 3100 and the substrate 3110. The display device 30 optimizes constructive interference and destructive interference between a plurality of vibrations of the support substrate 3100, thereby minimizing distortion of sound to improve a bass reproduction band and enhance the sound pressure level.

FIG. 26 is a bottom view of the yet another exemplary embodiment of the display device of FIG. 24.

Referring to FIG. 26, a display device 31 may include a support substrate 3100 and first and second sound generators 580 and 590. The support substrate 3100 and the first and second sound generators 580 and 590 may have substantially the same center point CP. The second sound generator 590 may include a generally circular side surface having a first radius r1. A generally circular arc part 3101 of the support substrate 3100 may include a generally circular side surface having a second radius r2 greater than the first radius r1. The first sound generator 580 may include a generally circular side surface having a third radius r3 smaller than the first radius r1. The second sound generator 590 may surround the first sound generator 580 at the distance from the first sound generator 580.

A distance d1 between one point on the side surface of the second sound generator 590 and the generally circular arc part 3101 of the support substrate 3100 may be substantially equal to a distance d1 between another point on the side surface of the second sound generator 590 and the generally circular arc part 3101 of the support substrate 3100.

Because the distances between different parts of the side surface of the second sound generator 590 and the circular arc part 3101 of the support substrate 3100 are substantially equal, vibrations generated from the second sound generator 590 may reach the generally circular arc part 3101 of the support substrate 3100 at substantially the same time. In this case, the vibrations reaching the generally circular arc part 3101 of the support substrate 3100 may have substantially the same amplitude and phase. In addition, the vibrations returning to the second sound generator 590 after reaching the generally circular arc part 3101 of the support substrate 3100 may reach the different parts of the side surface of the second sound generator 590 at substantially the same time. Even in this case, the vibrations reaching the different parts of the side surface of the second sound generator 590 may have substantially the same amplitude and phase.

Therefore, the display device 31 including the second sound generator 590 and the generally circular arc part 3101 of the support substrate 3100 separated apart from each other by a substantially constant distance can improve the sound pressure level of a sound output from the support substrate 3100 and the substrate 3110. The display device 31 optimizes constructive interference and destructive interference between a plurality of vibrations of the support substrate 3100, thereby minimizing distortion of sound to improve a bass reproduction band and enhance the sound pressure level.

For example, the first sound generator 580 may have a closed loop shape in plan view. The second sound generator 590 may have a closed loop shape while surrounding the first sound generator 580. The width d6 of the first sound generator 580 in plan view may be substantially equal to the width d7 of the second sound generator 590 in plan view. The first and second sound generators 580 and 590 may be driven independently to complement each other's vibrations. Therefore, the display device 31 including the first and second sound generators 580 and 590 can minimize THD and improve the sound pressure level of the display device 31.

In display devices constructed according to the principles and exemplary embodiments of the invention, distances between a plurality of side surfaces of a sound generator and a plurality of side surfaces of a display panel respectively corresponding to the side surfaces of the sound generator are substantially equal. Some of the advantages that may be achieved by exemplary implementations of the invention and/or exemplary methods of the invention include optimizing constructive interference and destructive interference between a plurality of vibrations of a display panel and minimizing distortion of sound to improve a bass reproduction band and enhance a sound pressure level.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel to display an image, the display panel having first through fourth side surfaces generally perpendicular or generally parallel to each other; and
a sound generator disposed on a surface of the display panel to vibrate the display panel,
wherein distances between each of first through fourth side surfaces of the sound generator and each of a plurality of side surfaces of the display panel respectively corresponding to the each of the plurality of side surfaces of the sound generator are substantially equal,
wherein the sound generator has a longitudinal axis generally parallel to the second or third side surface of the display panel, and the distances between each of the first through third side surfaces of the sound generator and each of the first through third side surfaces of the display panel are smaller than a distance between the fourth side surface of the sound generator and the fourth side surface of the display panel, and
wherein a ratio of a length of the first side surface of the display panel to a length of the second side surface generally perpendicular to the first side surface is substantially equal to a ratio of a length of the first side surface of the sound generator corresponding to the first side surface of the display panel to a length of the second side surface of the sound generator corresponding to the second side surface of the display panel.

2. The display device of claim 1, wherein the sound generator comprises a plurality of sound generators, each comprising one or more side surfaces respectively corresponding to the side surfaces of the display panel, and distances between each of the side surfaces of the display panel and at least some of the side surfaces of the sound generators respectively corresponding to the each of the side surfaces of the display panel are substantially equal.

3. The display device of claim 2, wherein the sound generator comprises first and second sound generators spaced apart from each other in a direction generally perpendicular to the first side surface and the second side surface of the display panel, and a first distance between a first side surface of the first sound generator and the first side surface of the display panel, a second distance between a second side surface of the second sound generator and the second side surface of the display panel, a third distance between a third side surface of the first or second sound generator and the third side surface of the display panel, and a fourth distance between a fourth side surface of the first or second sound generator and the fourth side surface of the display panel are all substantially equal.

4. The display device of claim 3, wherein each of the first through fourth distances is smaller than a distance between the first and second sound generators.

5. The display device of claim 2, wherein the sound generator comprises first and second sound generators spaced apart from each other in a direction generally parallel to the first side surface and the second side surface of the display panel, and a first distance between a first side surface of the first or second sound generator and the first side surface of the display panel, a second distance between a second side surface of the first or second sound generator and the second side surface of the display panel, a third distance between a third side surface of the first sound generator and the third side surface of the display panel, and a fourth distance between a fourth side surface of the second sound generator and the fourth side surface of the display panel are all substantially equal.

6. The display device of claim 5, wherein each of the first through fourth distances is smaller than a distance between the first and second sound generators.

7. The display device of claim 2, wherein the sound generator comprises first through fourth sound generators adjacent to first through fourth corners of the display panel, respectively, and a first distance between a first side surface of the first or second sound generator and the first side surface of the display panel, a second distance between a second side surface of the third or fourth sound generator and the second side surface of the display panel, a third distance between a third side surface of the first or third sound generator and the third side surface of the display panel, and a fourth distance between a fourth side surface of the second or fourth sound generator and the fourth side surface of the display are all substantially equal.

8. The display device of claim 1, wherein the sound generator comprises:
 a first sound generator having a plurality of side surfaces; and
 a second sound generator surrounding the first sound generator and having a plurality of side surfaces respectively corresponding to the side surfaces of the display panel.

9. The display device of claim 8, wherein the plurality of side surfaces of the second sound generator comprise first to fourth side surfaces, and distances between each of first through fourth side surfaces of the second sound generator and each of the first through fourth side surfaces of the display panel are substantially equal.

10. The display device of claim 8, wherein the first sound generator has a first width in plan view and the second sound generator has second width in plan view substantially equal to the first width.

11. A display device comprising:
 a display panel having first through fourth side surfaces; and
 a sound generator disposed on a surface of the display panel to vibrate the display panel and having first through fourth side surfaces respectively corresponding to the first through fourth side surfaces of the display panel, wherein distances between each of the first through third side surfaces of the sound generator and each of the first through third side surfaces of the display panel are substantially equal, wherein the sound generator has a longitudinal axis generally parallel to the second or third side surface of the display panel, and the distances between each of the first through third side surfaces of the sound generator and each of the first through third side surfaces of the display panel are smaller than a distance between the fourth side surface of the sound generator and the fourth side surface of the display panel, and wherein a ratio of a length of the first side surface of the display panel to a length of the second side surface generally perpendicular to the first side surface is substantially equal to a ratio of a length of the first side surface of the sound generator corresponding to the first side surface of the display panel to a length of the second side surface of the sound generator corresponding to the second side surface of the display panel.

12. A display device comprising:
 a substrate supporting a display surrounded by a first generally curved surface; and
 a sound generator disposed on a surface of the substrate to vibrate the substrate, the sound generator being surrounded by a second generally curved surface, wherein distances between each of a plurality of parts of the second generally curved surface and each of a plurality of parts of the first generally curved surface respectively corresponding to the plurality of parts of the second generally curved surface are substantially equal, wherein the substrate comprises a generally circular arc part having at least one generally circular arc and a protruding part extending from a side of the generally circular arc part, and further comprising a generally circular display part disposed on the generally circular arc part, wherein the sound generator has a generally circular shape corresponding to the generally circular display part and has substantially the same center point as the generally circular display part, and wherein the sound generator comprises:
 a first sound generator comprising a generally circular side surface having a first radius; and
 a second sound generator at least partially surrounding the first sound generator at a distance from the first sound generator, the second sound generator comprising a generally circular side surface having a second radius greater than the first radius.

13. The display device of claim 12, wherein the first sound generator has a first width in plan view and the second sound generator has a second width in plan view substantially equal to the first width.

* * * * *